(12) United States Patent
Tatge et al.

(10) Patent No.: US 11,151,485 B2
(45) Date of Patent: Oct. 19, 2021

(54) FARMING DATA COLLECTION AND EXCHANGE SYSTEM

(71) Applicant: Farmobile, LLC, Leawood, KS (US)

(72) Inventors: Jason G. Tatge, Bucyrus, KS (US); Heath Garret Gerlock, Omaha, NE (US); Randall Thomas Nuss, Lincoln, NE (US)

(73) Assignee: Farmobile, LLC, Leawood, KS (US)

( * ) Notice: Subject to any disclaimer, the term of this patent is extended or adjusted under 35 U.S.C. 154(b) by 0 days.

(21) Appl. No.: 17/198,456

(22) Filed: Mar. 11, 2021

(65) Prior Publication Data

US 2021/0201225 A1 Jul. 1, 2021

Related U.S. Application Data

(60) Division of application No. 15/794,463, filed on Oct. 26, 2017, which is a continuation of application No.
(Continued)

(51) Int. Cl.
*G06Q 10/06* (2012.01)
*H04W 4/029* (2018.01)
(Continued)

(52) U.S. Cl.
CPC ..... *G06Q 10/0631* (2013.01); *G06F 13/4027* (2013.01); *G06F 13/4282* (2013.01);
(Continued)

(58) Field of Classification Search
CPC .... G06Q 10/0631; G06Q 10/06; G06Q 50/02; H04W 4/029; H04W 4/40; H04W 4/025;
(Continued)

(56) References Cited

U.S. PATENT DOCUMENTS

| 3,693,332 A | 9/1972 | Bobard |
| 3,879,888 A | 4/1975 | Riley |
| (Continued) | | |

FOREIGN PATENT DOCUMENTS

| AU | 2012247058 B2 | 3/2016 |
| CN | 102440126 A | 5/2012 |
| (Continued) | | |

OTHER PUBLICATIONS

O-Hoon Choi et al., "Location Model for Clustering Location Information in Positioning System," 2007, Publisher: IEEE.*
(Continued)

*Primary Examiner* — Tuan C To
(74) *Attorney, Agent, or Firm* — Grady L. White; Potomac Law Group, PLLC

(57) ABSTRACT

Embodiments of the present invention provide a passive relay device for farming vehicles and implements, as well as an online farming data exchange, which together enable capturing, processing and sharing farming operation data generated during combined use of the farming vehicle and farming implement at a farming business. The farming operation data includes detailed information about individual farming operations, including without limitation the type of farming operation, the location of the farming operation, the travel path for the farming operation, as well as operating parameters and operating events occurring while the farming operation is performed.

10 Claims, 15 Drawing Sheets

Related U.S. Application Data

15/338,152, filed on Oct. 28, 2016, now abandoned, and a continuation of application No. 14/434,621, filed as application No. PCT/US2014/056818 on Sep. 22, 2014, now abandoned.

(60) Provisional application No. 61/881,320, filed on Sep. 23, 2013, provisional application No. 61/881,326, filed on Sep. 23, 2013.

(51) Int. Cl.
| | |
|---|---|
| *H04W 4/40* | (2018.01) |
| *H04L 29/08* | (2006.01) |
| *G06F 13/42* | (2006.01) |
| *G06F 13/40* | (2006.01) |
| *H04W 4/02* | (2018.01) |
| *G06Q 50/02* | (2012.01) |
| *H04L 12/40* | (2006.01) |

(52) U.S. Cl.
CPC .............. *G06Q 10/06* (2013.01); *H04L 67/12* (2013.01); *H04L 67/18* (2013.01); *H04W 4/025* (2013.01); *H04W 4/029* (2018.02); *H04W 4/40* (2018.02); *G06Q 50/02* (2013.01); *H04L 2012/40215* (2013.01)

(58) Field of Classification Search
CPC . G06F 13/4027; G06F 13/4282; H04L 67/12; H04L 67/18; H04L 2012/40215
USPC ............................................ 705/7.12; 701/50
See application file for complete search history.

(56) References Cited

U.S. PATENT DOCUMENTS

| | | | |
|---|---|---|---|
| 4,225,930 A | | 9/1980 | Steffen |
| 4,277,833 A | | 7/1981 | Steffen |
| 4,422,562 A | | 12/1983 | Rawson |
| 4,527,241 A | | 7/1985 | Sheehan et al. |
| 5,050,771 A | | 9/1991 | Hanson et al. |
| 5,072,805 A | | 12/1991 | Meiners |
| 5,302,956 A | | 4/1994 | Asbury et al. |
| 5,465,079 A | | 11/1995 | Bouchard et al. |
| 5,488,817 A | | 2/1996 | Paquet et al. |
| 5,581,464 A | | 12/1996 | Woll et al. |
| 5,666,792 A | | 9/1997 | Mullins |
| 5,666,793 A | | 9/1997 | Bottinger |
| 5,699,244 A | | 12/1997 | Clark et al. |
| 5,712,782 A | | 1/1998 | Weigelt et al. |
| 5,743,209 A | | 4/1998 | Bazin et al. |
| 5,838,277 A | * | 11/1998 | Loomis .................... G01S 19/14 342/357.52 |
| 5,897,600 A | * | 4/1999 | Elmore ............... A01M 7/0089 701/50 |
| 5,915,313 A | * | 6/1999 | Bender .................... A01C 7/06 111/178 |
| 5,919,242 A | * | 7/1999 | Greatline ................ G01S 19/14 701/50 |
| 5,955,973 A | * | 9/1999 | Anderson ............... G01S 11/10 340/988 |
| 5,978,720 A | | 11/1999 | Hieronymus et al. |
| 5,987,383 A | * | 11/1999 | Keller .................... A01B 69/007 342/357.36 |
| 6,023,232 A | | 2/2000 | Eitzenberger |
| 6,064,299 A | | 5/2000 | Lesesky et al. |
| 6,064,943 A | | 5/2000 | Clark et al. |
| 6,111,524 A | | 8/2000 | Lesesky et al. |
| 6,127,939 A | | 10/2000 | Lesesky et al. |
| 6,167,337 A | * | 12/2000 | Haack ....................... E02F 9/26 222/63 |
| 6,199,000 B1 | * | 3/2001 | Keller .................... A01C 21/005 701/50 |
| 6,216,071 B1 | | 4/2001 | Motz |
| 6,233,509 B1 | | 5/2001 | Becker |
| 6,236,907 B1 | | 5/2001 | Hauwiller et al. |
| 6,254,201 B1 | | 7/2001 | Lesesky et al. |
| 6,282,476 B1 | | 8/2001 | Hieronymus et al. |
| 6,360,179 B1 | | 3/2002 | Reep |
| 6,378,959 B2 | | 4/2002 | Lesesky et al. |
| 6,411,203 B1 | | 6/2002 | Lesesky et al. |
| 6,426,813 B1 | | 7/2002 | Swenson et al. |
| 6,467,039 B1 | | 10/2002 | Fredriksson |
| 6,546,705 B2 | | 4/2003 | Scarlett et al. |
| 6,582,033 B2 | | 6/2003 | Lesesky et al. |
| 6,594,579 B1 | | 7/2003 | Lowrey et al. |
| 6,608,554 B2 | | 8/2003 | Lesesky et al. |
| 6,671,698 B2 | | 12/2003 | Pickett et al. |
| 6,677,854 B2 | | 1/2004 | Dix |
| 6,728,268 B1 | | 4/2004 | Bird |
| 6,744,352 B2 | | 6/2004 | Lesesky et al. |
| 6,778,894 B2 | | 8/2004 | Beck et al. |
| 6,799,814 B2 | | 10/2004 | Lesesky et al. |
| 6,801,942 B1 | | 10/2004 | Dietrich et al. |
| 6,820,459 B2 | | 11/2004 | Beck et al. |
| 6,847,316 B1 | | 1/2005 | Keller |
| 6,988,033 B1 | | 1/2006 | Lowrey et al. |
| 6,990,459 B2 | | 1/2006 | Schneider |
| 7,015,800 B2 | | 3/2006 | Lesesky et al. |
| 7,059,689 B2 | | 6/2006 | Lesesky et al. |
| 7,073,314 B2 | | 7/2006 | Beck et al. |
| 7,116,221 B2 | | 10/2006 | Addy |
| 7,155,321 B2 | | 12/2006 | Bromley et al. |
| 7,183,941 B2 | | 2/2007 | Chuey |
| 7,218,497 B2 | | 5/2007 | Bolz |
| 7,253,721 B2 | | 8/2007 | Flohr et al. |
| 7,266,415 B2 | | 9/2007 | Fitzner |
| 7,278,373 B2 | | 10/2007 | Fuqua |
| 7,317,975 B2 | | 1/2008 | Woolford et al. |
| 7,349,772 B2 | | 3/2008 | DeLaney et al. |
| 7,356,050 B2 | | 4/2008 | Reindl et al. |
| 7,359,436 B2 | | 4/2008 | Berthy |
| 7,397,392 B2 | | 7/2008 | Mahoney et al. |
| 7,411,913 B2 | | 8/2008 | Birsan et al. |
| 7,441,189 B2 | | 10/2008 | Michaels |
| 7,449,993 B2 | | 11/2008 | Lesesky et al. |
| 7,466,757 B2 | | 12/2008 | Schuermans et al. |
| 7,493,198 B2 | | 2/2009 | Sonnenrein et al. |
| 7,497,529 B2 | | 3/2009 | Lesesky et al. |
| 7,502,353 B2 | | 3/2009 | Bolz |
| 7,507,917 B2 | | 3/2009 | Kaltenheuser |
| 7,519,455 B2 | | 4/2009 | Weiss et al. |
| 7,520,111 B2 | | 4/2009 | Berger et al. |
| 7,562,177 B2 | | 7/2009 | Campbell |
| 7,567,105 B2 | | 7/2009 | Trichy et al. |
| 7,581,031 B2 | | 8/2009 | Konz et al. |
| 7,650,734 B2 | | 1/2010 | Beck et al. |
| 7,689,334 B2 | | 3/2010 | Massen et al. |
| 7,761,334 B2 | | 7/2010 | Pickett et al. |
| 7,817,019 B2 | | 10/2010 | Lesesky |
| 7,855,573 B1 | | 12/2010 | Yost |
| 7,881,364 B2 | | 2/2011 | Noh et al. |
| 7,907,623 B2 | | 3/2011 | Ihle et al. |
| 7,929,461 B2 | | 4/2011 | Ramesh et al. |
| 7,967,396 B2 | | 6/2011 | Lesesky et al. |
| 8,006,190 B2 | | 8/2011 | Quoc et al. |
| 8,024,084 B2 | | 9/2011 | Breed |
| 8,065,062 B2 | | 11/2011 | Prebeck et al. |
| 8,126,606 B2 | | 2/2012 | Hung |
| 8,131,832 B1 | | 3/2012 | Hood et al. |
| 8,145,378 B2 | | 3/2012 | Schlingmann et al. |
| 8,195,231 B2 | | 6/2012 | Ring |
| 8,213,321 B2 | | 7/2012 | Butts et al. |
| 8,232,871 B2 | | 7/2012 | Lesesky |
| 8,248,984 B2 | | 8/2012 | Loubier |
| 8,276,996 B2 | | 10/2012 | Lesesky et al. |
| 8,346,432 B2 | | 1/2013 | Wiemeersch et al. |
| 8,364,440 B2 | | 1/2013 | Putkonen |
| 8,498,771 B2 | | 7/2013 | Dwan et al. |
| 8,504,864 B2 | | 8/2013 | Menon et al. |
| 8,509,257 B2 | | 8/2013 | Yakashiro |
| 8,527,137 B2 | | 9/2013 | Sakakibara |
| 8,542,069 B2 | | 9/2013 | Kelling et al. |

(56) References Cited

U.S. PATENT DOCUMENTS

| | | | |
|---|---|---|---|
| 8,630,768 B2 | 1/2014 | McClellan et al. | |
| 8,680,976 B2 | 3/2014 | Lesesky | |
| 8,718,797 B1 | 5/2014 | Addepalli et al. | |
| 8,730,818 B2 | 5/2014 | Isaac et al. | |
| 8,768,565 B2 | 7/2014 | Jefferies et al. | |
| 8,786,421 B2 | 7/2014 | Dozza | |
| 8,799,520 B2 | 8/2014 | Schelkle et al. | |
| 8,868,304 B2 | 10/2014 | Bonefas | |
| 8,874,282 B2 | 10/2014 | Fredriksson | |
| 8,919,848 B2 | 12/2014 | Ricci | |
| 8,924,030 B2 | 12/2014 | Wendte et al. | |
| 8,928,732 B2 | 1/2015 | Cho et al. | |
| 8,950,260 B2 | 2/2015 | Gelinske et al. | |
| 8,977,408 B1 | 3/2015 | Cazanas et al. | |
| 8,996,232 B2 | 3/2015 | Dwan et al. | |
| 9,010,704 B2 | 4/2015 | Sirek et al. | |
| 9,026,267 B2 | 5/2015 | Schwarz et al. | |
| 9,026,711 B2 | 5/2015 | Kessler | |
| 9,031,710 B2 | 5/2015 | Barrett | |
| 9,031,740 B2 | 5/2015 | Kuramochi et al. | |
| 9,043,073 B2 | 5/2015 | Ricci | |
| 9,055,022 B2 | 6/2015 | Ricci | |
| 9,077,586 B2 | 7/2015 | Yousefi et al. | |
| 9,110,951 B2 | 8/2015 | Jiang | |
| 9,112,721 B2 | 8/2015 | Behrens et al. | |
| 9,118,509 B2 | 8/2015 | Jang | |
| 9,152,938 B2 | 10/2015 | Lang et al. | |
| 9,172,785 B2 | 10/2015 | Scholz et al. | |
| 9,173,100 B2 | 10/2015 | Ricci | |
| 9,183,064 B2 | 11/2015 | Ahmed et al. | |
| 9,202,252 B1 | 12/2015 | Smith et al. | |
| 9,203,640 B2 | 12/2015 | Xi et al. | |
| 9,209,942 B2 | 12/2015 | Takada et al. | |
| 9,215,168 B2 | 12/2015 | Kim et al. | |
| 9,244,109 B2 | 1/2016 | Smith et al. | |
| 9,251,631 B2 | 2/2016 | Thompson et al. | |
| 9,269,200 B2 | 2/2016 | Schmidt | |
| 9,331,854 B2 | 5/2016 | Oguma et al. | |
| 9,345,194 B2 | 5/2016 | Schroeder et al. | |
| 9,376,894 B2 | 6/2016 | Abicht et al. | |
| 9,426,243 B2 | 8/2016 | Whitley et al. | |
| 9,571,605 B1 | 2/2017 | Givoly | |
| 9,667,710 B2 | 5/2017 | Wilbur et al. | |
| 9,746,985 B1 | 8/2017 | Humayun et al. | |
| 2002/0133505 A1 | 9/2002 | Kuji | |
| 2003/0081632 A1 | 5/2003 | Kielhofer et al. | |
| 2003/0182144 A1 | 9/2003 | Pickett et al. | |
| 2003/0182259 A1 | 9/2003 | Pickett et al. | |
| 2003/0182260 A1 | 9/2003 | Pickett et al. | |
| 2004/0010349 A1 | 1/2004 | Perez et al. | |
| 2005/0015189 A1* | 1/2005 | Posselius | A01B 79/005 |
| | | | 701/50 |
| 2005/0038581 A1 | 2/2005 | Kapolka et al. | |
| 2005/0060070 A1 | 3/2005 | Kapolka et al. | |
| 2005/0065678 A1 | 3/2005 | Smith et al. | |
| 2005/0154500 A1 | 7/2005 | Sonnenrein et al. | |
| 2005/0240987 A1 | 10/2005 | Taguchi | |
| 2006/0020402 A1 | 1/2006 | Bischoff et al. | |
| 2006/0088044 A1 | 4/2006 | Hammerl | |
| 2006/0095174 A1 | 5/2006 | Sonnenrein et al. | |
| 2006/0106539 A1 | 5/2006 | Choate et al. | |
| 2006/0182040 A1 | 8/2006 | Wiewesiek et al. | |
| 2006/0271262 A1 | 11/2006 | McLain | |
| 2006/0282467 A1 | 12/2006 | Peterson et al. | |
| 2008/0005431 A1 | 1/2008 | Juppo | |
| 2008/0030320 A1 | 2/2008 | Wilcox et al. | |
| 2008/0161989 A1 | 7/2008 | Breed | |
| 2008/0215208 A1 | 9/2008 | Carlson | |
| 2008/0221743 A1 | 9/2008 | Schwarz et al. | |
| 2009/0099737 A1 | 4/2009 | Wendte et al. | |
| 2009/0118904 A1* | 5/2009 | Birnie | G01C 21/00 |
| | | | 701/41 |
| 2009/0144171 A1 | 6/2009 | Whitehead | |
| 2009/0177566 A1 | 7/2009 | Browna | |
| 2010/0036696 A1 | 2/2010 | Lang et al. | |
| 2010/0199080 A1 | 8/2010 | Kolb | |
| 2010/0253508 A1 | 10/2010 | Koen et al. | |
| 2010/0268402 A1 | 10/2010 | Schwarz et al. | |
| 2011/0022442 A1 | 1/2011 | Wellman et al. | |
| 2011/0035096 A1 | 2/2011 | Liebl et al. | |
| 2011/0072123 A1 | 3/2011 | Hsu et al. | |
| 2011/0093639 A1 | 4/2011 | Richards | |
| 2011/0125940 A1 | 5/2011 | Aue et al. | |
| 2011/0160994 A1 | 6/2011 | Schmidt et al. | |
| 2011/0188371 A1 | 8/2011 | Brunnberg et al. | |
| 2011/0234388 A1 | 9/2011 | Lesesky et al. | |
| 2011/0257882 A1 | 10/2011 | McBurney et al. | |
| 2011/0295460 A1 | 12/2011 | Hunt et al. | |
| 2012/0101861 A1 | 4/2012 | Lindores | |
| 2012/0101934 A1 | 4/2012 | Lindores et al. | |
| 2012/0104828 A1 | 5/2012 | Grathwol | |
| 2012/0109520 A1 | 5/2012 | Hood et al. | |
| 2012/0109614 A1 | 5/2012 | Lindores | |
| 2012/0182935 A1 | 7/2012 | Addepalli et al. | |
| 2012/0185212 A1 | 7/2012 | Ekelin | |
| 2012/0227647 A1 | 9/2012 | Gelinske et al. | |
| 2012/0253709 A1 | 10/2012 | Schmidt et al. | |
| 2012/0253743 A1 | 10/2012 | Schmidt | |
| 2012/0296476 A1 | 11/2012 | Cale et al. | |
| 2012/0330733 A1 | 12/2012 | Tiller et al. | |
| 2013/0013149 A1 | 1/2013 | Lesesky et al. | |
| 2013/0040600 A1 | 2/2013 | Reitnour et al. | |
| 2013/0073299 A1 | 3/2013 | Warman et al. | |
| 2013/0103629 A1 | 4/2013 | Vaiciulis et al. | |
| 2013/0110321 A1 | 5/2013 | Wiemeersch et al. | |
| 2013/0166365 A1 | 6/2013 | Yoder et al. | |
| 2013/0197806 A1 | 8/2013 | Belzer et al. | |
| 2013/0200991 A1 | 8/2013 | Ricci et al. | |
| 2013/0203400 A1 | 8/2013 | Ricci | |
| 2013/0205412 A1 | 8/2013 | Ricci | |
| 2013/0211628 A1 | 8/2013 | Thurow et al. | |
| 2013/0219039 A1 | 8/2013 | Ricci | |
| 2013/0275316 A1 | 10/2013 | Teng | |
| 2013/0282946 A1 | 10/2013 | Ricci | |
| 2013/0325988 A1 | 12/2013 | Morewitz et al. | |
| 2013/0332205 A1 | 12/2013 | Friedberg et al. | |
| 2013/0339721 A1 | 12/2013 | Yasuda | |
| 2013/0340444 A1 | 12/2013 | Bryant et al. | |
| 2014/0040434 A1 | 2/2014 | Rybak et al. | |
| 2014/0062723 A1 | 3/2014 | Kluge et al. | |
| 2014/0121891 A1 | 5/2014 | Barrett et al. | |
| 2014/0122147 A1 | 5/2014 | Christie et al. | |
| 2014/0122757 A1 | 5/2014 | Barrett et al. | |
| 2014/0129146 A1 | 5/2014 | Romier | |
| 2014/0129148 A1 | 5/2014 | Harmer et al. | |
| 2014/0129748 A1 | 5/2014 | Muth | |
| 2014/0156675 A1 | 6/2014 | Burstein et al. | |
| 2014/0201824 A1 | 7/2014 | Agbabian | |
| 2014/0257911 A1 | 9/2014 | Anderson | |
| 2014/0350774 A1 | 11/2014 | Mouzakitis et al. | |
| 2014/0357311 A1 | 12/2014 | Suzuki et al. | |
| 2015/0044966 A1 | 2/2015 | Shultz et al. | |
| 2015/0052405 A1 | 2/2015 | Maiolani et al. | |
| 2015/0215398 A1 | 7/2015 | Chang et al. | |
| 2015/0220401 A1 | 8/2015 | Jiang et al. | |
| 2015/0234767 A1 | 8/2015 | Tatge et al. | |
| 2015/0242799 A1 | 8/2015 | Seki et al. | |
| 2015/0244806 A1 | 8/2015 | Renac et al. | |
| 2015/0279176 A1 | 10/2015 | Hyde et al. | |
| 2015/0298669 A1 | 10/2015 | Boeer et al. | |
| 2016/0048709 A1 | 2/2016 | Butler et al. | |
| 2016/0048712 A1 | 2/2016 | Butler et al. | |
| 2016/0071223 A1 | 3/2016 | Rupp et al. | |
| 2016/0202851 A1 | 7/2016 | Turner et al. | |
| 2016/0275580 A1 | 9/2016 | Uechi | |

FOREIGN PATENT DOCUMENTS

| | | | |
|---|---|---|---|
| CN | 102598945 | A | 7/2012 |
| CN | 202635058 | U * | 1/2013 |
| CN | 102986428 | A * | 3/2013 |
| CN | 103069947 | A * | 5/2013 |
| CN | 103271000 | A * | 9/2013 |
| DE | 102008035948 | A1 | 2/2010 |

(56) References Cited

FOREIGN PATENT DOCUMENTS

| | | | |
|---|---|---|---|
| EP | 0702891 A1 | 3/1996 | |
| EP | 0740896 A2 | 11/1996 | |
| EP | 1170913 A2 | 1/2002 | |
| EP | 1189393 A2 | 3/2002 | |
| EP | 1504648 A1 | 2/2005 | |
| EP | 1676221 A2 | 7/2006 | |
| EP | 1903351 A1 * | 3/2008 | ........... G01S 19/071 |
| EP | 2702846 A2 | 3/2014 | |
| ES | 1023605 | 3/1994 | |
| ES | 2352133 B1 | 9/2011 | |
| GB | 2133554 A | 7/1984 | |
| GB | 2133556 A | 7/1984 | |
| JP | 2006228177 A | 8/2006 | |
| JP | 5098723 B2 | 12/2012 | |
| JP | 2013126829 A | 6/2013 | |
| KR | 20120029816 A | 3/2012 | |
| KR | 20120035606 A | 4/2012 | |
| KR | 20120044454 A | 5/2012 | |
| KR | 20120076565 A | 7/2012 | |
| KR | 20130052431 A | 5/2013 | |
| RU | 2152147 C1 | 7/2000 | |
| RU | 2007110484 A | 9/2008 | |
| RU | 2008120611 A | 12/2009 | |
| WO | 9404940 A1 | 3/1994 | |
| WO | 9404975 A1 | 3/1994 | |
| WO | 9505649 A1 | 2/1995 | |
| WO | 9516225 A1 | 6/1995 | |
| WO | 9524688 A1 | 9/1995 | |
| WO | 9717232 A1 | 5/1997 | |
| WO | 0052485 A1 | 9/2000 | |
| WO | 0161617 A1 | 8/2001 | |
| WO | 0215517 A2 | 2/2002 | |
| WO | 0217540 A2 | 2/2002 | |
| WO | 02073484 A2 | 9/2002 | |
| WO | 2002088972 A1 | 11/2002 | |
| WO | 03105093 A1 | 12/2003 | |
| WO | 03105094 A1 | 12/2003 | |
| WO | 03105434 A1 | 12/2003 | |
| WO | 2004019209 A1 | 3/2004 | |
| WO | 2004092857 A2 | 10/2004 | |
| WO | 2004114055 A2 | 12/2004 | |
| WO | 2005039936 A2 | 5/2005 | |
| WO | 2006005628 A2 | 1/2006 | |
| WO | 2005107362 A3 | 4/2006 | |
| WO | 2007104806 A1 | 9/2007 | |
| WO | 2008019008 A2 | 2/2008 | |
| WO | 2009058341 A1 | 5/2009 | |
| WO | 2011019453 A1 | 2/2011 | |
| WO | 2011063530 A1 | 6/2011 | |
| WO | 2011064445 A1 | 6/2011 | |
| WO | 2012092588 A1 | 7/2012 | |
| WO | 2012092592 A1 | 7/2012 | |
| WO | 2012092599 A1 | 7/2012 | |
| WO | 2012109742 A2 | 8/2012 | |
| WO | 2013000923 A1 | 1/2013 | |
| WO | 2013019742 A2 | 2/2013 | |
| WO | 2013053978 A1 | 4/2013 | |
| WO | 2013084205 A1 | 6/2013 | |
| WO | 2013096716 A1 | 6/2013 | |
| WO | 2013096721 A2 | 6/2013 | |
| WO | 2013116706 A2 | 8/2013 | |
| WO | 2014050524 A1 | 4/2014 | |
| WO | 2014137813 A1 | 9/2014 | |
| WO | 2015042540 A1 | 3/2015 | |

OTHER PUBLICATIONS

Zhen Xiao et al., "Optimizing Buffer Management for Reliable Multicast," 2002, Publisher: IEEE.*
Bin Guo et al., "Impact of Sloping Land Conversion Program on off-farm employment," 2011, vol. 3, Publisher: IEEE.*
Persson et al., "A Bluetooth—CAN Gateway," Master's Thesis, Chalmers University of Technology, Feb. 1, 2001.
Poljarvi et al., "Distributed System Architectures, Standardization, and Web-Service Solutions in Precision Agriculture," GEOProcessing 2012: The Fourth International Conference on Advanced Geographic Information Systems, Applications and Services, 2012.
Pyramid Solutions, Inc., "Bridgeway J1939 Data Mapping Explained," Feb. 1, 2013.
Raine, "Technology bridges gap in information flow," The Western Producer, Jul. 26, 2012, http://www.agintegrated.com/confirmed-rumors/technology-bridges-gap-in-information-flow/#content-page-anchor.
Robinson, "Precision Ag: Making Wireless Work," www.cottongrower.com, Apr. 14, 2011.
Sensor-Technik Wiedmann Gmbh, "ESX-C2C," product brochure, Oct. 26, 2007.
Shearer et al., "Trends in Automation of Agricultural Field Machinery," 2011.
Slingshot, "Slingshot—How it works," Sep. 3, 2011, https://web.archive.org/web/20110903231020/http://www.ravenslingshot.com:80/en/How%20it%20works.aspx.
Smallwood, "HEM Data debuts Dawn Mini-Logger," Commercial Carrier Journal, Apr. 21, 2010.
Spangler, "Further Development and Applications of IsoAgLib," Oct. 13, 2004.
Spangler, "Open Source Program Library for LBS (DIN 9684) LBSlib Version 0.2.1," Feb. 6, 2002.
Steinberger et al., "Mobile farm equipment as a data source in an agricultural service architecture," Computers and Electronics in Agriculture, vol. 65, pp. 238-246, 2009.
TeeJet Technologies, "An Introduction to ISOBUS and Its Importance to You," 2007.
TeeJet Technologies, "Easy Integration, Total Compatability and Non-Obsolescence are Cor Components in Our Technology Strategy," Jan. 3, 2007.
Topcon, "Topcon Tierra Remote Asset Management," Apr. 2009.
Topcon, "Topcon Tierra Remote Asset Managment," Feb. 2010.
Webster, "Single-pass corn stover harvest system productivity and cost analysis," Iowa State Master's Thesis, Jun. 4, 2008.
Welte et al., "An Approach to Farm Management Information Systems Using Task-Specific, Collaborative Mobile Apps and Cloud Storage Services," 2013 ASABE Annual International Meeting, Paper No. 131579954, Jul. 21-24, 2013.
Welte et al., "Autogenic Mobile Computing Technologies in Agriculture: Applications and Sensor Networking for Smart Phones and Tablets," EFITA-WCCA-CIGR Conference: Sustainable Agriculture through ICT Innovation, Jun. 23-27, 2013.
White, "New Holland Intellisteer and Case AFS Accuguide preview," Farming Ahead, No. 151, p. 25, Aug. 2004.
Wollenhaupt, "ICT and the Agricultural Equipment Industry Threat? Promise? Reality?," Global Technology Product Management, Mar. 22, 2007.
Wollenhaupt, "Why is ISOBUS Important for Your Operation? ISO 11783 Electronic Standard and Infield Information Handling," AGCO Corporation presentation, Sep. 16, 2003.
WTK-Elektronik Gmbh, "Uni-Box, The Extension for your ISOBUS system," Nov. 28, 2009.
Zhang et al., "A PDA-based system for Farmland data collection and transmission," Proceedings of the International Symposium on Intelligent Information Systems and Applications, pp. 162-165, Oct. 28-30, 2009.
Zheng et al., "Development of a smart mobile farming service system," Mathematical and Computer Modeling, vol. 54, pp. 1194-1203, Aug. 2011.
"ISOBlue to send equipment data to smartphones," AgProfessional, Jun. 27, 2013.
"Purdue's ISOBlue Project Aims to Make Precision Farming Data More Open," www.precisionfarmingdealer.com, Jun. 26, 2013.
AGCO Advanced Technology Solutions, "Agcommand Product Guide Standard and Standard Plus," v 1.1, 2009.
agintegrated.com, "Onsite Beta Update—May 17, 2012—Onsite set for Jun. 25th launch at the IDEAg Interconnectivity Conference," May 17, 2012.
AGTALK, "ISOBUS thoughts from a geek," May 8, 2009.

(56) References Cited

OTHER PUBLICATIONS

Alabama Precision AG Extension, "Telematics: Wireless Communication and Data Transfer," Alabama Cooperative Extension System, Sep. 2012, www.AlabamaPrecisionAgOnline.com.
ANTX, Inc., "Messenger User's Guide," Version 2.2.0, Dec. 2, 2008.
Auernhammer, "Precision farming—the environmental challenge," Computers and Electronics in Agriculture, vol. 30, pp. 31-43, 2001.
Auernhammer, "The Role of Mechatronics in Crop Product Traceability," Agricultural Engineering International: the CIGR Journal of Scientific Research and Development, Invited Overview Paper, vol. 4, presented at the Club of Bologna meeting Jul. 27, 2002.
Ault, "ISOBlue Updates," ISOBlue Google Group, Jul. 14, 2013.
Ault, "ISOBlue Updates," Jul. 13, 2013.
Ault, ISOBlue update, Jul. 30, 2013, https://groups.google.com/forum/#!topic/isoblue/sFBmvukL23Y.
Aware Vehicle Intelligence Installation Manual for Sterling Models 2001 Acterra and Newer, Mar. 6, 2008.
Baltazar, "Track Your Fleet Via the Web with Tierra," Construction Equipment, p. 46, Jun. 2009.
Beck et al., "ISOBUS Task Controller Workshop," presentation at John Deere Jun. 4, 2008.
Bottger et al., "New technology for variable rate pesticide application," Landtechnik, vol. 58, pp. 142-143, Mar. 2003.
CAN Automotion, "Standalone and Distributed Control System Components and Total Machine Control from CAN Automotion," Dec. 3, 2012.
CAN Automotion, "STW Launches New ESX-TC3 Controller with New BSP V2.2," Nov. 23, 2012.
CAN Newsletter Online, "Open source project accesses Isobus," Jul. 8, 2013.
CAN-CiA, "CAN in Automation (CiA), History of CAN technology," May 2, 2017, https://www.can-cia.org/can-history.
Darr, "CAN Bus Technology Enables Advanced Machinery Management," Iowa State University Agricultural and Biosystems Engineering Publications, Sep. 2012.
Ehsani, "Increasing Field Efficiency of Farm Machinery Using GPS," University of Florida. IFAS Extension, AE466, Aug. 2010.
Fantesini et al., "Smartphones and tablets integration into agricultural and forestry machineries," Jul. 12, 2012.
Felmeth, "ISO11783 a Standardized Tractor—Implement Interface," CAN in Automation, pp. 08-8-08-13, 2003.
Flint et al., "Precision ag data to go wireless," www.farmprogress.com, Sep. 2010.
Geotab, "Announcing Geotab G05 Premium Vehicle Tracking Device," press release, Apr. 5, 2011, https://www.geotab.com/press-release/u-blox.
Godwin, R.J., "Advances in Labour and Machinery Management for a Profitable Agriculture and Forestry," Agricultural Engineering International: the CIGR Ejournal. Manuscript CIOSTA 07 007, vol. IX, Dec. 2007.
Ham et al., "Design and Implementation of Virtual Terminal Based on ISO11783 Standard for Agricultural Tractors," Division of Electronic Engineering, Chonbuk National University, 2012.
HEM Data, "Meet the DAWNtm Mini Logger Family," 2010.
Henninger, "ISOBUS—The Future Has Long Since Begun," Landtechnik, vol. 62, pp. 206-207a, Apr. 2007.
Hest, "Telematics 2.0," Farm Industry News, www.farmindustrynews.com, Sep. 29, 2010.
Hopkins, "2013 Precision Agriculture Product Review," PrecisionAg, Feb. 1, 2013.
Hopkins, "FarmLogs Backs Purdue Open Precision Data Initiative," www.precisionag.com, Jun. 26, 2013.
Iftikhar et al., "Flexible exchange of farming device data," Computers and Electronics in Agriculture, vol. 40, Issues 1-3, pp. 45-55, Oct. 2003 (Abstract).
IsoAgLib, Overview of Communication Protocol Services of IsoAgLib for DIN 9684 and ISO 11783, Oct. 13, 2004.
LHP Telematics, "Data Broker Mixed Fleet Solution," graphic, Apr. 20, 2013.
LHP Telematics, "LHP Telematics Mixed Fleet Data Broker," Apr. 20, 2013.
Mayer, "Farm-level data integration: future problems and consequences for public and private structures," 122nd EAAE Seminar "Evidence-Based Agricultural and Rural Policy Making: Methodological and Empirical Challenges of Policy Evaluation," Ancona, Feb. 17-18, 2011.
Mazzetto et al.,"Proposal of a simplified monitoring approach of environmental performances of farm tractors through a local telemetry network," 2013 EFITA WCCA CIGR Sustainable Agriculture through ICT innovation Conference, Jun. 23-27, 2013, Torino, Italy.
Meyer et al., "Tablet-PC increases the machinery control," Landtechnik, vol. 68, No. 1, pp. 10-13, Feb. 1, 2013.
Mohamed, "Analysis of Telematics Systems in Agriculture," Thesis submitted to Czech University, May 2013.
Munack et al., "Communication Technology Is the Backbone of Precision Agriculture," Agricultural Engineering Interational: the CIGR Journal of Scientific Research and Development, vol. 3, May 2001.
Nemenyi et al., "The role of GIS and GPS in precision farming," Computers and Electronics in Agriculture, vol. 40, Issues 1-3, pp. 45-55, Oct. 2003.
NEXIQ Technologies, "Commercial Vehicle Diagnostic Product Catalog," 2011.
NEXIQ Technologies, "Commercial Vehicle Diagnostic Product Catalog," 2013.
NEXIQ Technologies, "Heavy-Duty Diagnostic Product Catalog," 2010.
NEXIQ Technologies, "The Next Evolution of Heavy Duty Diagnostics Pro-Link Graphiq," 2004.
Oksanen et al., "Open Configurable Control System for Precision Farming," ASAE International Conference of Automation Technology for Off-road Equimpment, Kyoto, Japan, pp. 184-191, 2004.
Peets et al., "Methods and procedures for automatic collection and management of data acquired from on-the-go sensors with application to on-the-go soil sensors," Computers and Electronics in Agriculture, vol. 81, pp. 104-112, Feb. 2012.
Hopewell et al., "Optimising the Design of Offshore Wind Farm Collection Networks," IEEE, pp. 84-88, 2011.
Norasmanizan et al., Land Suitability Mapping for Implementation of Precision Farming, IEEE, 2011.
Oya et al., "Development of an Automatic Farm Works Recording System Using GPS," SICE Annual Conference, Waseda University, Tokyo, Japan, pp. 1590-1594, Sep. 13-18, 2011.
Cai et al., "Address Extraction: A Graph Matching and Ontology-Based Approach to Conceptual Information Retrieval," IEEE Proceedings of the Third International Conference on Machine Learning and Cybernetics, pp. 1571-1576, Aug. 2004.
Murakami et al., "Proposed of Cultivation Management System with Informatics and Communication Technology," The 1st. IEEE Global Conference on Consumer Electronics, 2012.
Newman et al., "Comparing Methods to Extract Technical Content for Technological Intelligence," IEEE 2012 Proceedings of PICMET '12: Technology Management for Emerging Technologies, pp. 1279-1285, 2012.
Zhenhu et al., "An Intellectual Management System for Soil Sample Collecting," IEEE, 2010.

* cited by examiner

PHASE 1) PASSIVE JOB DATA ACQUISITION PHASE:

PHASE 2) ECU DATA EXTRACTION PHASE:

PHASE 3) PASSIVE FIELD BOUNDARY GENERATION PHASE:

PHASE 4) PASSIVE JOB GENERATION PHASE:

PHASE 5) FARM DATA SHARING PHASE:

FARMING DATA COLLECTION AND EXCHANGE SYSTEM

CROSS REFERENCE TO RELATED APPLICATIONS

This application is a divisional of U.S. patent application Ser. No. 15/794,463, filed Oct. 26, 2017, which is a continuation of U.S. patent application Ser. No. 15/338,152, filed Oct. 28, 2016, which is a continuation of U.S. patent application Ser. No. 14/434,621, filed Apr. 9, 2015, which is a U.S. national stage entry of PCT/US2014/056818, filed Sep. 22, 2014, which claims priority to U.S. Provisional Application No. 61/881,320, filed Sep. 23, 2013, and U.S. Provisional Application No. 61/881,326, filed Sep. 23, 2013, all of which are incorporated herein by reference in their entirety.

TECHNICAL FIELD

The present invention relates generally to automated systems and methods for capturing, processing and sharing farming data, and more particularly to systems and methods for capturing farming operation data in real time using passive data collection devices attached to farming equipment while the farming equipment is used to perform the farming operations, and then processing and sharing the farming operation data via an online farming data exchange system or server.

BACKGROUND ART

Contemporary farming machines, such as tractors and planters, include computer systems and controllers capable of permitting farmers and farming business to exercise extremely precise control over almost every aspect of a farming operation, such as fertilizing, planting, spraying or harvesting crops in a field. In a technique known as precision farming, the computer systems and related technology available today permits farming businesses to program the farming equipment to carry out farming operations almost entirely under automated control of software programs that can automatically activate and deactivate the machines, and even particular sections, row units, nozzles or blades on the implement at precisely the right time and place in order to optimize inputs such as seed, pesticide and fertilizer, and thereby achieve greater yields. During the course of performing farming operations, the computer systems and technology onboard the farming vehicles and farming implements typically transmit, receive and respond to electronic messages containing an enormous amount of very detailed operational data that describes almost every aspect of the farming operation. For example, if the farming vehicle and the farming implement used during a farming operation are a tractor and a sprayer, respectively, then the tractor and the sprayer will use the onboard computer systems and computer network to exchange and respond to a large number of messages that include critical operating parameters for the sprayer, such as, among other things, the sprayer's on/off status, working width, x-offset (i.e., driving direction), y-offset, target rate, application rate, master valve on/off status, total volume of spray applied, total area sprayed, total distance driven and total time used. It would be extremely useful to capture, store, analyze and share these operating parameters. A farmer could use this information, for example, to determine and compare what resources were used, where, and with what settings, and a seed company could study and use the information to improve seed product yields.

However, the conventional precision farming techniques, computer systems and related technology has heretofore failed to provide farming businesses and other interested parties with an easy-to-use, unobtrusive, secure and reliable way to capture, store, share and profit from what is fast becoming a massive amount of very detailed, and enormously valuable, farming operation data generated by these automated farming techniques, machines and computer systems. Thus, critically important farming operation data, such as how much seed, fertilizer, water, and pesticide were used on a particular field, how often the field was treated with a particular chemical, which parts of the field were left untreated for some reason, what were the weather conditions during the farming operation, what kind of equipment was used to perform the farming operation, which settings were activated during the farming operation, and which field was treated during the farming operation often goes uncollected and, therefore, remains unavailable for study and analysis to the farmers and other interested parties in the agricultural industry.

Being able to precisely identify and describe the particular field where a farming operation takes place, and determining which parts of that field were treated and which parts were left untreated for one reason or another is an extremely important function for farming businesses, farming insurance companies, seed manufactures and government entities. The Farms Services Agency (FSA) of the USDA is currently in the process of developing and implementing a common land unit (CLU) data layer (or database) to provide farm agency programs with a mapping of all of the farm fields in the United States, or at least all of those farm fields involved, or likely to be involved, in FSA programs. The FSA defines a common land unit (CLU) as a unit of agricultural land associated with United States Department of Agriculture (USDA) farm programs and that has a permanent, contiguous boundary, a common land cover and land management, a common owner and a common producer. CLU boundaries are usually delineated by relatively permanent features such as fence lines, roads, and/or waterways. The official CLU data layer is intended to provide an accurate description of the locations, shapes and sizes of the fields where farming operations are taking place.

Unfortunately, there are a number of problems and disadvantages associated with CLUs as currently implemented by the FSA. Chief among these problems is the fact that CLUs are mainly created by the tedious process of manual inspections conducted on the land, or viewing satellite-generated images of the land and drawing boundaries on maps that match landmarks and demarcations (such as fence lines, roads and/or waterways) as observed by the humans viewing the satellite images. Both of these methods for creating CLUs are labor-intensive and error-prone, and typically result in extremely inaccurate and unreliable CLU boundaries. Another problem associated with the CLU data layer is that the process of manually drawing boundaries around landmarks to create the CLUs does not account for sections of farming land that, for one reason or another, are not currently being used for farming operations. In other words, CLUs merely describe field perimeters, and fail to account for, or even identify, potentially large sections of infertile or otherwise non-arable land that may be wholly encompassed by those perimeters, which are not being used for farming operations. These areas may exist, for example, because they cover a part of a field that is too wet, or too rocky, or too steep to plant. The current process for creating and defining CLUs also does not account very well for ownership changes on the land, or agreements between owners to merge tracts of land for joint farming operations.

As a consequence of these and other problems associated with the current system for creating and updating CLUs, the database of CLUs in the FSA's official CLU data layer actually lacks the accuracy and precision it truly needs to have in order for that database to become the reliable and enormously useful tool envisioned by the USDA. Moreover, CLUs are only used in the United States. Therefore, systems and methods for monitoring and collecting farming operation data that rely on CLUs alone will not be useful in most other agriculturally significant countries.

DISCLOSURE OF THE INVENTION

Embodiments of the current invention address the above-described problems by providing a relay device, a farming data exchange system and computer-implemented methods for tracking, collecting, storing and sharing farming operation data for farming businesses. Accordingly, one embodiment of the present invention provides a relay device for collecting, interpreting, storing and transmitting data associated with farming operations that take place at a farming business. A farming business is any area of land or water (for aquaculture) that is devoted primarily to producing and managing food (i.e. produce, grains, or livestock), fibers, and increasingly fuel. A farming business may be owned and operated by a single individual, a family, a community, a corporation or a company, and can be a holding of any size. A farming business may comprise, without limitation, a dairy farm, an orchard, a vineyard, a stable, a ranch, a garden, a fish farm, a feedlot, a farmstead or a plantation. A farming operation for a farming business is any farming job, task, chore, assignment or activity performed on or over land or water at the farming business, including without limitation, activities such as clearing land, tilling soil, mowing grass, irrigating or crop-dusting a field, feeding, herding or transporting animals, or fertilizing, planting, spraying or harvesting a crop. Farming vehicles may include, without limitation, tractors, trucks, automobiles, all-terrain vehicles (ATVs), or any other self-propelled vehicle or machine typically used to carry out farming operations. Farming implements may include, without limitation, cultivators, pickers, harrows, plows, rotators, rollers, mowers, seeders, feeders, planters, drills, spreaders, fertilizers, sprayers, sorters, harvesters, conveyors, carts, wagons, threshers, pickers, reapers, transporters, loaders, balers, milking machine, grinder, splitter or trailer, to name a few examples.

The relay device includes a microprocessor, a bus connector, a global positioning receiver, a memory storage area, a cellular radio and an application program. The bus connector connects the relay device to a message bus on a farming vehicle or farming implement, the message bus being configured to carry messages generated by the farming vehicle or the farming implement while the farming vehicle and the farming implement are used to perform the farming operation. The global positioning system (GPS) receiver receives position and time signals from space-based satellites while the farming operation is performed.

The memory storage area in the relay device stores (i) an electronic farm record for the farming business, (ii) descriptive information about one or more farming operation land segments associated with the farming business, and (iii) a collection of implement profiles defining, for a collection of known farming implements, a known manufacturer code, a known device class, a known version and a known communication protocol. The electronic farm record for the farming business includes general information about the farming business, as well as detailed descriptions for each farming operation carried out at the farming business, including, for example, information indicating the date, time and location of each farming operation, the type of farming operation (e.g., fertilizing, planting or spraying operations) and certain operating events that occurred during the performance of each farming operation. In preferred embodiments, the electronic farming record also includes precision farming data for each farming operation carried out at the farming business, including, for instance, the volume and type of fertilizer, pesticide, feed or seed used during the farming operation, the weather conditions during the farming operation, as well as all of the operating states, modes and operating parameters used by the farming implement during the farming operation, as reflected in the messages transmitted over the message bus by the farming implement and the farming vehicle while the farming operation is performed.

The memory storage area on the relay device includes descriptive information about one or more farming operation land segments, or "FOLS," associated with the farming business. A FOLS is a contiguous or non-contiguous parcel of land on the earth where a farming operation takes place, and as such, may comprise a farm, field, lot or pasture, or a combination of two or more farms, fields, lots or pastures. Thus, the descriptive information about one or more FOLS may be recorded in the memory in a variety of different ways, including without limitation, a latitude coordinate, a longitude coordinate, a perimeter or boundary for a farm, field or lot, a shape file for a farm, field or lot, a surface area measurement for a farm, field or lot, or a length for a perimeter for a farm, field or lot, to name but a few examples. A FOLS may or may not correspond with an official government-sponsored zone or other designation for a farm, field or lot. A FOLS may also comprise any identifiable parcel of land associated with the farming business, taking into account the local or national system for naming parcels of farming land in the area of interest. For example, if the farming business exists in a country or territory (such as the United States) where parcels of land used for farming activities are uniquely identified by "common land unit" (CLU) numbers, then each FOLS in the collection of FOLS described in the memory storage area of the relay device might be defined to be coextensive with a CLU. Depending on the needs and objectives of the particular embodiment of the farming data collection and sharing exchange system of the present invention, however, a FOLs could also be defined by the system operator as encompassing two or more CLUs, partially traversing one or more CLUs (not coextensive with them), entirely encompassed by a CLU, or something altogether different from a CLU, as may be desirable or necessary under the circumstances. Notably, a FOLS may include land that is not actually treated by a farming implement during a particular farming operation. Thus, a farming operation, such as planting corn, may only cover a portion of an entire FOLS (e.g., the northernmost end of a designated FOLS). In any event, descriptive information about a collection of designated FOLS associated with the farming business is stored in the memory of the relay device so that the application program may subsequently use the stored FOLS descriptions to determine and report, based on GPS signals and operating events, which FOLS hosted the farming operation, as will be described in more detail below.

The application program comprises programming instructions that, when executed by the microprocessor, will cause the microprocessor to automatically extract content from one or more messages transmitted on the message bus, and then use the extracted content to automatically determine that there is a match between the farming implement used to perform the farming operation and the known farming implement in the implement profile. Because of this match, the system now "knows" which farming implement is being used, and because of the known communication protocol for the known farming implement, the system now "knows" the "language" that the farming implement uses to communicate with the farming vehicle over the message bus.

Armed with this information, the application program next uses the extracted content, the position and time signals from the GPS receiver, and the known communication protocol defined by the implement profile for the known farming implement to determine a set of operating events that occur during performance of the farming operation. Examples of an operating events may include, for instance, events associated with the farming implement, such as activating and deactivating the implement, activating and/or deactivating certain sections or row units on the implement, receiving a signal or instruction from the farming vehicle, a transmission by the implement of a signal representing a low-feed, low-fuel or power-fail condition, an increase or decrease in volume or pressure readings, etc. In general, the application program is configured to derive operative events based on changes in operating parameters for the farming implement or farming vehicle that occur while the farming operation is being performed. For example, if the application program of the relay device interprets a message (in accordance with the communication protocol) to indicate that a "flow rate" operating parameter associated with a particular nozzle on a sprayer implement has dropped to zero, then the application program may be configured to record the change in the flow rate operating parameter as a "deactivation" operating event for the nozzle.

On an agricultural farm, many different types of farming operations will cover the same ground (i.e., the same FOLS) over the course of a crop year. For example, a land clearing operation, a soil tilling operation, a fertilizing operation, a planting operation, a spraying operation and a harvesting operation may all take place on the same FOLS (which may or may not be coextensive with a CLU or other government-supplied designation). Although every one of these operations may take place on the same FOLS, it is unlikely that the boundaries and the surface areas for the land covered in every one of these operations is exactly the same. For example, the boundaries and surface areas for the land subjected to the planting and harvesting operations may be somewhat smaller than (or different from) the boundaries and surface areas covered by the land clearing, soil tilling and fertilizing operations. Thus, it may be important, for farming data collection and sharing purposes, to keep track of, not only the FOLS where a farming operation took place, but also the travel path for the farming operation that takes place on the FOLS.

Accordingly, the application program of the present invention also uses the extracted content, the position and time signals from the GPS receiver and the known communication protocol defined by the implement profile for the known farming implement to determine a "travel path" for the farming operation. A travel path for a farming operation is a specific area of land on the earth (or in a FOLS) where a farming operation (e.g., planting corn) is performed by the farming vehicle and farming implement. Notably, unlike a FOLS, the travel path does not include any areas of land on the FOLS where the farming operation (planting corn) was not performed during the farming operation. Thus, if a farmer uses a tractor to plant corn on all of the land in a field (or FOLS) except the land sitting underneath or surrounding a cellphone tower located at the southeast corner of the field (or FOLS), then the travel path for that farming operation (planting corn) is the entire surface area of the field (or FOLS) EXCEPT for the area of land sitting underneath or surrounding the cellphone tower. In other words, a map representing the travel path for the corn planting farming operation would have a hole (or gap) in it corresponding to the portion of the field sitting underneath or surrounding the cellphone tower.

Similarly, if a farmer plants around a shallow pond located in the field (or FOLS), or avoids a section of the field (or FOLS) because it is too wet (mud prevents the machine from operating effectively), too close to a busy highway, or otherwise unfarmable, then the travel path for that farming operation (planting corn), will not include the avoided section of the field (or FOLS) because no corn was planted in the avoided section of the field (of FOLS). Moreover, if the farmer drives over part of the field (or FOLS) with the planter implement turned off, or certain row units of the planter implement turned off, then the sections of land that the farmer drove over with the planter implement or the row units turned off would not be included in the travel path. For purposes of this disclosure, examples of row units may include, without limitation, a disc for turning the ground, a plow for rolling the ground, a harrow for breaking up the ground, a tine for smoothing out the ground, a seed-dropping mechanism for dropping seed in the ground, a spray nozzle for spraying pesticide or fertilizer, a spout for spreading a pesticide or fertilizer, a mechanism for cutting or harvesting a crop, or a combination of two of such devices.

Finally, the application program in the relay device uses the set of operating events, the travel path and the descriptive information about the FOLS stored in the memory to identify the FOLS where the farming operation occurred. In some embodiments, the application will further determine the type of farming operation that occurred. Non-limiting examples of farming operation types include planting, spraying, fertilizing, feeding and harvesting. The application program records the details of the farming operation, including the farming operation type, date and time, as well as the appropriate descriptive information for the FOLS where the farming operation occurred, in the electronic farm record for the farming business.

Another embodiment of the present invention provides a farming data exchange system, comprising a microprocessor, a first data store for storing a user account and an electronic farming record for the farming business, a second data store for storing descriptive information about a farming operation land segment associated with the farming business, and a third data store for storing an implement profile defining, for a known farming implement, a known manufacturer code, a known device class, a known version and a known communication protocol. The farming data exchange system further comprises a network interface configured to receive message data, position data and time data acquired by a remote relay device connected to a farming vehicle or farming implement while the farming vehicle or farming implement are used to perform a farming operation at the farming business. An application program on the farming data exchange system comprises programming instructions that, when executed by the microprocessor, will cause the microprocessor to automatically extract content from the message data and use the extracted content to determine that there is a match between the farming implement used to perform the farming operation and the known farming implement of the implement profile. The application will then use the extracted content, the position data, the time data and the known communication protocol defined by the implement profile for the known farming implement to determine a set of operating events and a travel path for the farming operation. The application program will then use the set of operating events, the travel path and the descriptive information stored in the database to determine that the farming operation occurred on the farming operation land segment, and to record the farming operation and the descriptive information for the farming operation land segment in the electronic farm record.

In yet another embodiment, the present invention provides a system and method for monitoring message data on an ISO 11783 message bus (ISOBUS) to detect, identify, extract and store operating parameters exchanged between a farming implement and a farming vehicle during performance of a farming operation.

BRIEF DESCRIPTION OF THE DRAWINGS

The invention will be understood by the following detailed description in conjunction with the accompanying drawings, wherein like reference numerals designate like structural elements, and in which.

MODES FOR CARRYING OUT THE INVENTION

Figure 1:
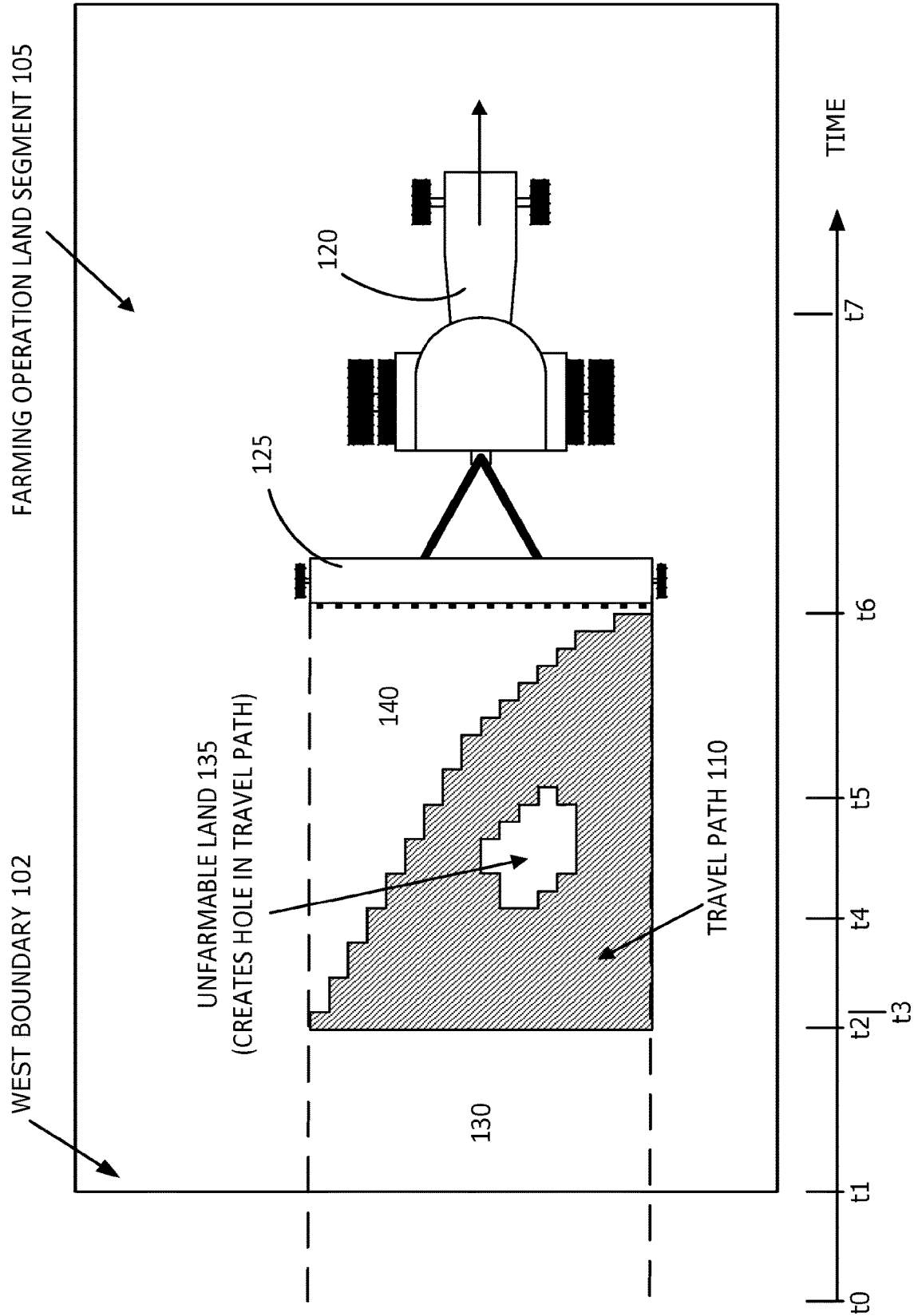
FIG. 1 shows a diagram illustrating, by way of example only, a farming operation land segment (FOLS) and a travel path for an ongoing farming operation in accordance with embodiments of the present invention.

Embodiments of the present invention provide a passive relay device for farming vehicles and implements, as well as an online farming data exchange, which together enable capturing, processing and sharing farming operation data generated during combined use of the farming vehicle and farming implement at a farming business. The farming operation data includes detailed information about individual farming operations, including without limitation the type of farming operation, the location of the farming operation, the travel path for the farming operation, as well as operating parameters and operating events occurring while the farming operation is performed. The locations are expressed in terms of "farming operation land segments" (or FOLS), instead of CLUs, because CLUs are not used in every agriculturally significant country. The travel paths identify areas on the FOLS where the farming vehicle and farming implement traveled during the farming operations with the farming implement activated and engaged, and does not include areas of land on the FOLS where the farming vehicle and farming implement either (a) did not travel during the farming operation, or (b) did not travel while the farming implement was activated and engaged. The application programs in embodiments of the present invention first extract and parse the content of messages transmitted on the message bus to determine which one of potentially many different implement profiles stored in the memory matches the implement profile generating and transmitting the messages. Among other things, each implement profile identifies a communication protocol for a known implement. Thus, when an application program determines that the implement in use matches an implement profile stored in the memory, the application program then "knows" the communication protocol that the current implement uses to communicate with the farming vehicle. The known communication profile provides a key that permits the application program to parse subsequent messages transmitted over the message bus in order to identify the operating parameters for the current farming operation. These operating parameters, along with global positioning system data received from the GPS receiver on the relay device while the farming operation is being performed, permit the application program to determine the nature and timing of operating events occurring during the farming operation (such as turning the seeding or spraying functionality on and off). The application program then uses the operating events and the global positioning system data to identify a travel path and a FOLS for the farming operation. After the application program determines the travel path and the FOLS for the farming operation, the electronic farming record for the farming business is updated to include an indication that a new farming operation has taken place, and to include descriptive information about the type of operation, the operating events, the travel path and the FOLS associated with the farming operation.

Notably, the farming operation data acquired by the relay attached to the farming vehicle and farming implement may be transmitted to a remote farming data exchange system in real time while farming vehicle and farming implement are still performing the farming operation. Alternatively, the farming operation data may be collected by the relay, stored in the relay's memory or some other memory storage device for some period of time, and uploaded to the farming data exchange system at a later time. The farming data exchange system comprises physical hardware elements and logic that together operate to permit the farming data uploaded to the exchange system to be securely stored, processed, analyzed, shared and reported to authorized account holders, such as farmers, seed and fertilizer manufacturers, agronomists, various government agencies and farming insurance providers.

Because the methods and systems of the present invention create the travel paths from global positioning data, operating parameters and operating events generated by the farming vehicle or farming implement while the farming vehicle and implement are activated and engaged, the travel paths created by the current invention identify specific areas of land on the earth where the blades and seeds and fertilizer are actually hitting the dirt, and does not rely on any assumptions about where those blades, seeds and fertilizer "might be" or "could be" hitting the dirt based solely on the location of a CLU that was manually created by human observation and annotation of satellite imagery. And because the travel paths describe the sections of farmland where blades, seeds and fertilizer are actually being used, those same travel paths also show, by definition, sections of farmland (represented by "gaps" or "holes" or other boundaries in the travel path) that are not treated during a particular farming operation. Accordingly, the travel path information produced and recorded by embodiments of the present invention are far more precise, far more informative, and far more reliable than CLUs.

In addition to creating, processing and providing authorized access to records comprising operating parameters, travel paths and FOLS, embodiments of the present invention also provide a farming data processing system that automatically receives farming data messages from a relay device attached to a farming machine, via a WI-FI or cellular network interface as the farming equipment is being used to perform a farming operation at a farming business—the messages including global positioning data and operational parameters. The farming data processing system creates a record in an electronic farming data database for the farming business, and automatically distributes the records in response to authorized requests from authorized subscribers.

The farming vehicles and farming implements may include, without limitation, tractors, planters, balers, drills, harvesters, cultivators, sprayers, pickers, spreaders, mowers, harrows, wind rowers, plows and any other type of agricultural field equipment.

FIG. 1 shows a diagram illustrating, by way of example only, a farming operation land segment (FOLS) 105 and a travel path 110 for an ongoing farming operation in accordance with embodiments of the present invention. As shown in FIG. 1, at time t0, a farming vehicle 120, such as a tractor, begins towing a farming implement 125, such as a sprayer, toward a FOLS 105 while the farming implement 125 is deactivated and/or all of the spraying nozzles on farming implement 125 are switched off. Depending on the country or territory, the boundaries of FOLS 105 may or may not correspond to (be coextensive with) a common land unit (or CLU). At time t1, the farming vehicle 120 and farming implement 125 cross over the west boundary 102 of FOLS 105 and continues moving across FOLS 105 in an easterly direction (from the left side of the page to right side of the page in FIG. 1) while the farming implement 125 remains deactivated and/or all of the spray nozzles are switched off. Because all of the spray nozzles on farming implement 125 are switched off from time t1 to time t2, the area of land 130 in FOLS 105 remains untreated during the farming operation. Therefore, the area of land 130 on FOLS 105 is not considered to be a part of the travel path 110 for the farming operation, even though the farming vehicle 120 and the farming implement 125 travels across the area of land 130 during the farming operation.

At time t2 in FIG. 1, the farming vehicle operator (not shown) operates controls in the cab of the farming vehicle 120 so as to send electronic signals to the farming implement 125 that cause the farming implement 125 to be activated and all of the spray nozzles on the farming implement 125 to be switched on. Alternatively, the farming implement 125 and spray nozzles may be automatically activated in accordance with programming instructions in a precision farming program running on a computer system installed in the farming vehicle 120. Shortly thereafter, beginning at time t3 and ending at time t6, the spray nozzles on the farming implement 125 begin to automatically switch off in consecutive fashion in accordance with operator commands or precision farming program instructions, in order to avoid spraying in a specific area of land 140 on FOLS 105. At time t6, all of the spray nozzles on farming implement 125 have been switched off, thereby ending the travel path 110 in the farming operation. The overall effect of turning the spray nozzles off in consecutive fashion while the implement moves across the FOLS 105 is the creation of a travel path 110 having a "stair-stepped" boundary corresponding to the places where additional nozzles were deactivated. It is noted that, if the nozzles are reactivated during the same farming operation, such as at time t7, additional pieces of land on the FOLS 105 will be considered to be included in the travel path 110, even though these additional pieces of land are not contiguous with the piece of land shown as travel path 110 in FIG. 1.

As illustrated by FIG. 1, it will occasionally be necessary or desirable to temporarily switch off certain nozzles on farming implement 125 as the farming implement 125 is towed across the FOLS 105 in order to avoid spraying a patch of unfarmable land 135. When this occurs, the travel path 110 identified and recorded by embodiments of the present invention will reflect the fact that travel path 110 encompasses a hole or gap 135 corresponding to the pieces of land in FOLS 105 where certain nozzles (or all nozzles) on the farming implement 125 were switched off.

Figure 2:
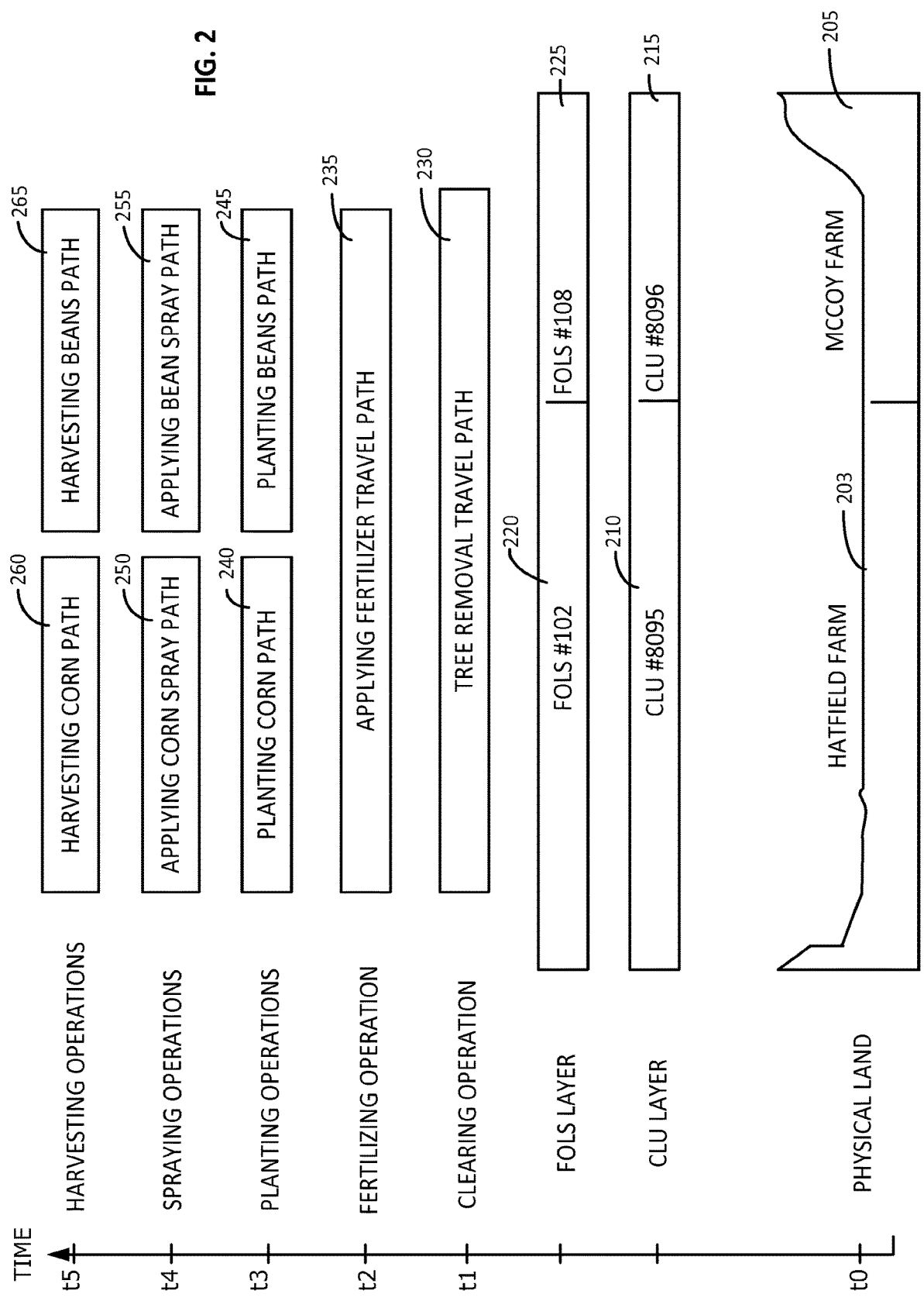
FIG. 2 shows a diagram further illustrating, by way of example only, the relationships between travel paths, FOLS, CLUs and physical land at a farming business.

FIG. 2 shows a diagram further illustrating, by way of example only, the relationships between travel paths, FOLS, CLUs and physical land at a farming business. As shown in FIG. 2, two farming businesses (the Hatfield Farm 203 and the McCoy Farm 205) are located on physical land situated in a low-lying area between two sets of foothills. In accordance with the FSA CLU project, the Hatfield Farm 203 has been designated in the CLU layer as CLU #8095, while the McCoy Farm 205 is identified in the CLU layer as CLU #8096. In this example, an embodiment of the present invention uses FOLS numbers in addition to (or instead of) CLUs. As it happens, however, FOLS #102 and FOLS #108 (designated by reference numbers 220 and 225 in FIG. 2) are coextensive with CLU #8095 and CLU #8096, respectively.

See 210 and 215 in in FIG. 2. Before planting any crops, both farming businesses must remove all of the trees on the low-lying areas of land situated between the foothills. Since the McCoys do not own tree-removal equipment, the McCoys pay the Hatfields to remove all of the trees from the McCoy Farm 205, except for the trees located on the foothills, at the same time that the Hatfields are removing all of the trees from the Hatfield Farm 203 (except for the trees on the foothills). Thus, at time t1, a massive tree-removal operation occurs on all of the land represented by travel path 230, which covers part of the land in FOLS #102, part of the land in FOLS #108, part of the Hatfield Farm 203, part of the McCoy Farm 205, and all of the land between the foothills. Therefore, a relay device attached to the Hatfield tree-removal equipment, or a farming data exchange system (not shown in FIG. 2), operating in accordance the embodiments of the present invention, would create or amend an electronic farming record (EFR) for the Hatfield's farming business to include entries containing a description and a set of operating events associated with the tree removal farming operation, a description of the FOLS (i.e., FOLS #102 and FOLS #108) affected by the tree-removal farming operation, as well as a description of the travel path 230 for the farming operation. The recorded description of the travel path in the EFR may comprise, for example, a multi-dimensional array containing geospatial coordinates corresponding to the boundaries of the tree-removal operation.

As shown in FIG. 2, over a period of time (t2-t5), a plurality of additional farming operations (including fertilizing, planting, spraying and harvesting operations) may be performed on the same physical land, each farming operation having a unique travel path 235, 240, 245, 250, 255, 260 and 265, respectively, and these travel paths do not necessarily correspond with the boundaries of any particular farming business property, FOLS or CLU. In the example illustrated by the diagram in FIG. 2, for instance, if the McCoys rent a portion of the Hatfield property in order to grow more beans than their own land can accommodate, then the electronic farming records associated with the McCoy Farm farming business will include travel paths 245, 255 and 265 for the McCoy's planting, spraying and harvesting operations, which cross over the boundaries between the farming businesses, CLUs and FOLS associated with those farming businesses.

Figure 3:
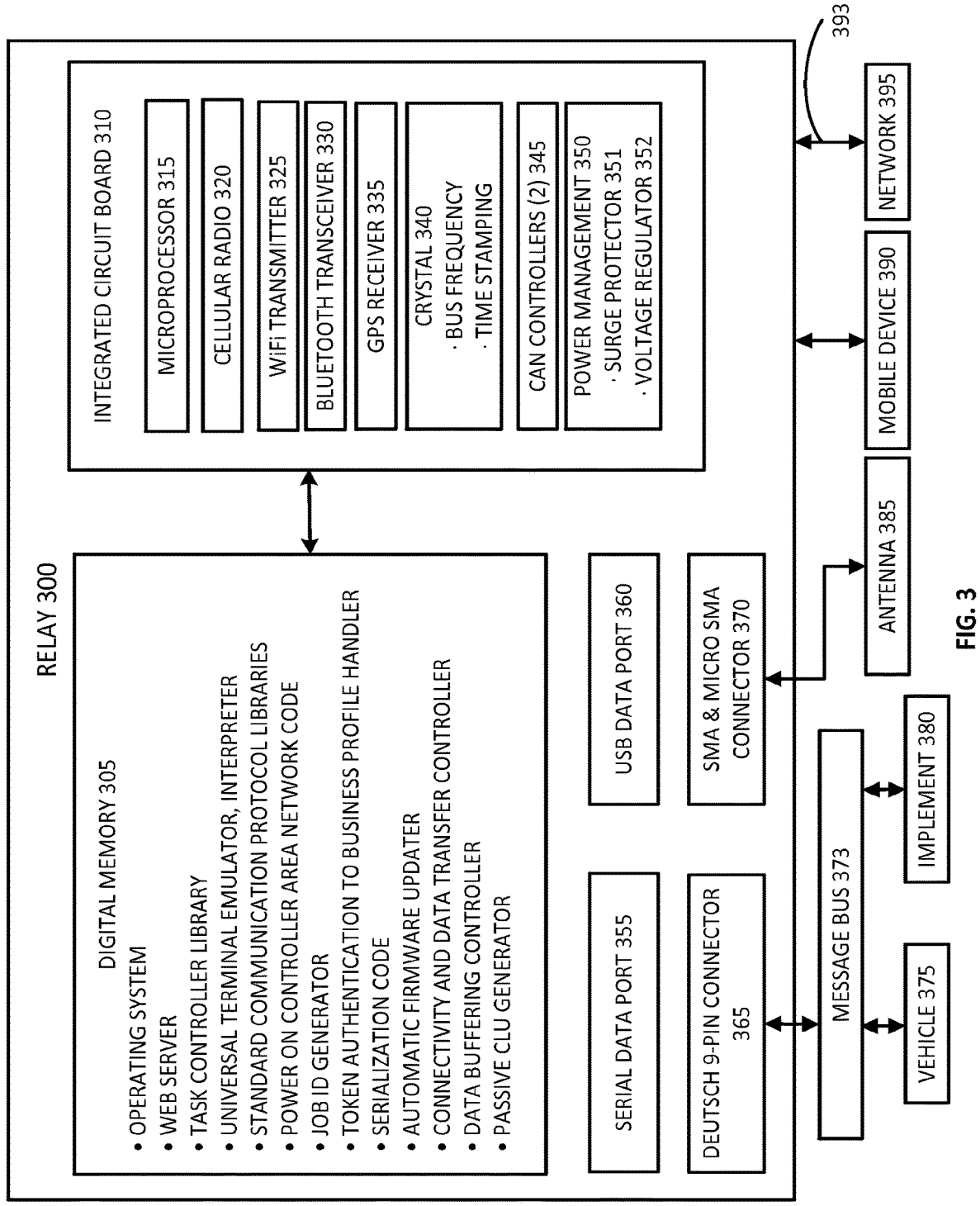
FIG. 3 shows a high-level block diagram of a relay device in accordance with an embodiment of the present invention.

FIG. 3 shows a high-level block diagram of a relay device 300 in accordance with an embodiment of the present invention. In general terms, the purpose of the relay device 300 is to relay information, such as farming operation data generated by farming vehicles, such as tractors, and farming implements, such as planters, to a farming data exchange system 500 such as the system depicted in FIG. 5 and described in more detail below. The farming operation data may be uploaded from the relay device 300 to the farming data exchange system 500 in real time using a cellular connection, or alternatively, the farming operation data may be stored in a memory area 305 on the relay device 300, downloaded to a memory stick or other portable device (not shown in FIG. 3), which is in turn uploaded to a standard personal computer (not shown) and then uploaded to the farming data exchange system 500 from the personal computer via an Internet or other wide area network connection.

In some embodiments, the relay device 300 may also be configured to use a Wi-Fi transmitter 325 for network communications and also act as a Wi-Fi hotspot. Typically, the relay device 300 will have a cellular radio transceiver 320 built into it, which is configured to establish a data communications link 393 with one or more nearby mobile devices 390 (e.g., smartphone or tablet computer) that can access and browse the Internet and/or World Wide Web.

Farming vehicles and farming implements typically include a number of different sensors that are all connected to a message bus 373, sometimes referred to as a "controller area network" or "CAN." The message bus 373 usually provides power to the sensors. The relay device 300 is connected to the message bus 373 on the farming vehicle 375 or the farming implement 380. As such, the relay device 300 can also act as a diagnostic tool for the message bus 373. Notably, farming vehicles 375 and farming implements 380 sometimes each have their own message bus. So the relay device 300 is optionally configured to receive data from two different message buses simultaneously. The relay device 300 has one or more application programs that can detect messages that are being transmitted or broadcasted over message bus 373, transmit those raw messages to the farming data exchange system 500 for interpretation, and/or interpret and transmit the raw messages being transmitted or broadcasted over the message bus 373.

In preferred embodiments, the relay device 300 includes controllers for power management 350, a surge protector 351 and a voltage regulator 352. The voltage regulator 352 ensures a consistent flow of energy through the relay device 300. The relay device 300 may also include a crystal 340 that keeps all of the message bus traffic in sync. Preferably, the crystal 340 is finely tuned so that it produces ticks as fast as one-tenth or one-hundredth of a second, which means the relay device 300 can provide data time stamp events at these higher resolutions.

A GPS receiver 335 may be soldered onto the main integrated circuit board 310. Alternatively, it may be connected to a daughter card (not shown) that's plugged into a header on the integrated circuit board 310. Ideally, the GPS receiver 335 is a high-precision GPS receiver capable of taking readings as frequently as 10 times per second or higher. Typically, the application programs running on the relay device 300 will include routines and algorithms configured to parse and interpret GPS data sent to the relay device 300 in the form of "NMEA sentences" in accordance with National Marine Electronics Association specification for GPS data. Preferably, the relay device 300 also has a built-in BlueTooth transceiver 330 that allows the relay device 300 to transmit data to mobile device 390, and to receive data transmitted from the mobile device 390.

Preferably, the relay device 300 includes connectors that permit the relay device 300 to connect to a variety of different external data sources using a variety of different communication protocols. As shown in FIG. 3, for example, the relay device 300 may comprise a serial data port 355, a universal serial bus (USB) data port 360 and a Deutsch 9-pin connector 365 consistent with the ISO-11783 input/output connection standard for controller area networks on farming vehicles and farming implements. The relay device 300 may also include an SAE J1939 or an SAE J1708/J1587 data port (not shown), as well as an SMA and Micro SMA connector 370 designed specifically for connectivity with a GPS antenna 385 tuned to the frequencies of global positioning satellites in space orbit.

The on-board digital memory 305 of the relay device 300 includes an operating system and a number of software libraries and custom software controllers, including a library for programmatic communication of commands, signals and operating parameters used by a task controller on the farming vehicle or farming implement. A universal terminal emulator and interpreter broadcasts a universal terminal interface as a webpage to the mobile device 390 via an application installed on the mobile device 390. The relay device 300 also includes standard communication protocols for the various types of transceivers and busses connected to the relay device 300.

The relay device 300 includes a microprocessor 315 and one or more application programs, running on the relay device 300, which include programming instructions that, when executed by the microprocessor 315, will cause the microprocessor 315 to monitor the message data transmitted or broadcasted on the message bus 373. The application programs may also be configured to power up the relay device 300 or put the device into sleep mode when there is no data being transmitted or broadcasted over the message bus 373. Other application programs (or the same application program) keep track of time, which may be received from the GPS receiver, and generate job IDs, which may be associated with the farming operations as they are being performed.

When a farmer first sets up the relay device 300, the relay device 300 will be associated with the farmer's farming business account on the farming data exchange 500. An authentication process provided on the mobile device 390 allows the farmer to establish and use a data communications link 393 to initiate and complete data transfers of operating parameters and global positioning data from the relay 300 to the farming data exchange system 500 in the cloud.

Ideally, the relay device 300 is serialized so that the farming data exchange system 500 can uniquely identify every relay device attempting to connect and upload farming data. Preferably, the relay device 300 also includes automatic firmware updating software, so that every time the relay device powers up, it will check for an active Internet connection and, if necessary, download and install the latest versions of all of the software necessary for operation of the relay device 300.

A data buffering controller is provided in case no network connection is available while the farming vehicle and farming implement are performing a farming operation, in which case the data that is being transmitted on the message bus 373 will be stored in the on-board digital memory 305. Periodically, the data buffering controller will re-check the status of the network connection, and, as soon as it is available, initiate an upload of all of the buffered data to the farming data exchange system 500. Preferably, the data buffering controller is also configured to prioritize the data transmissions so that critical data might be uploaded to the farming data exchange system 500 in real-time, while non-critical data might be uploaded at an off-peak time.

Figure 4:
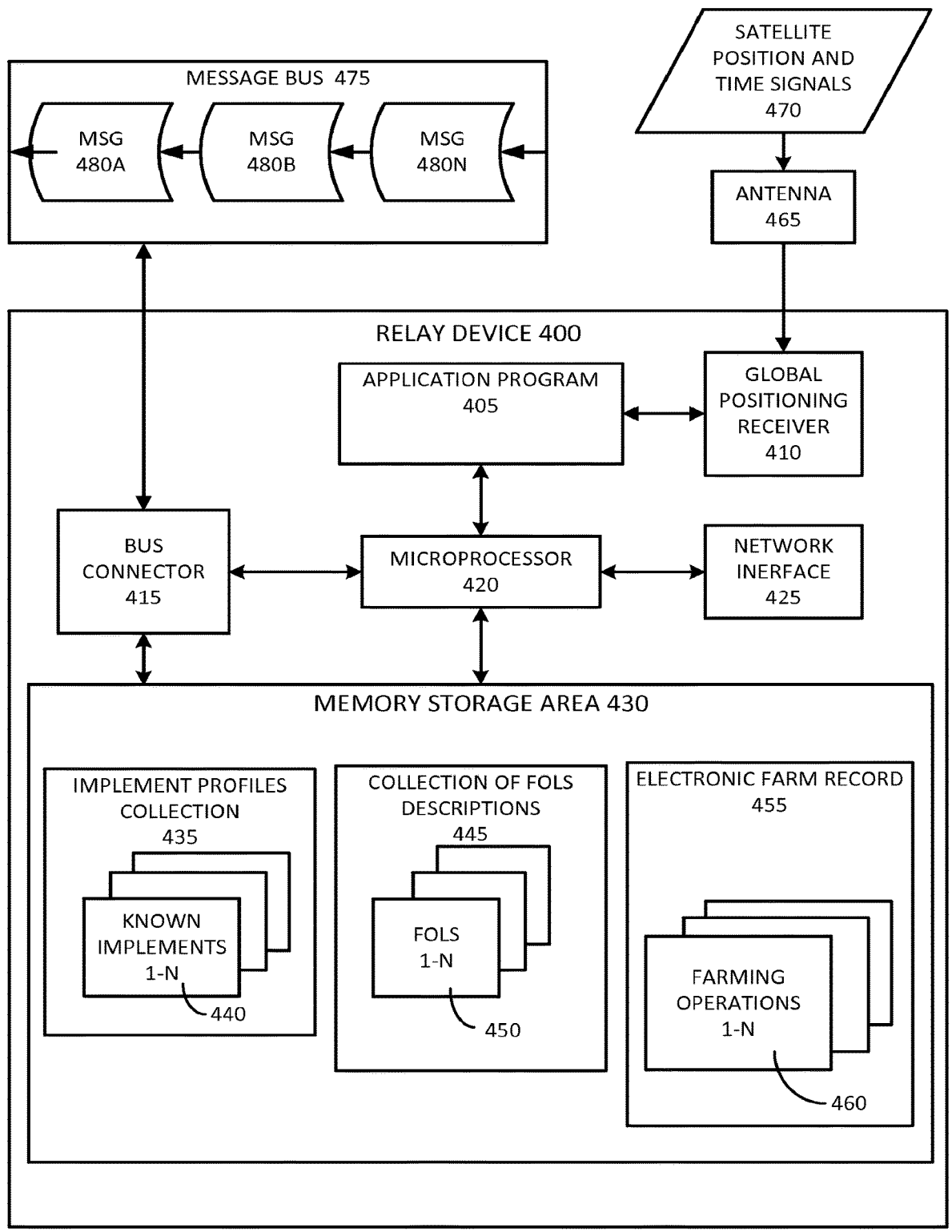
FIG. 4 shows a high-level block diagram illustrating, by way of example only, the primary physical and logical components of a relay device, like the relay device shown in FIG. 3, configured to operate in accordance with some embodiments of the present invention.

FIG. 4 shows a high-level block diagram illustrating, by way of example only, the primary physical and logical components of a relay device 400, like the relay device 300 shown in FIG. 3, configured to operate in accordance with some embodiments of the present invention. As shown in FIG. 4, the relay device 400 includes a microprocessor 420, a bus connector 415, a global positioning receiver 410, a memory storage area 430 and an application program 405. It will be understood by those skilled in the art that the functions of the application program 405, as described herein, may be implemented via plurality of separate programs or program modules configured to communicate and cooperate with one another to achieve the desired functional results. The bus connector 415 connects the relay device 400 to a message bus 475 on a farming vehicle or farming implement (not shown in FIG. 4), the message bus 475 being configured to carry messages 480A-480N generated by the farming vehicle or the farming implement while the farming vehicle and the farming implement are used to perform the farming operation. The global positioning system (GPS) receiver 410 is connected to an antenna 465 tuned to receive position and time signals 470 generated by space-based satellites (not shown) while the farming operations are being performed.

The memory storage area 430 on the relay device 400 is configured to store a collection 435 of implement profiles defining, for a collection of known farming implements 440, a known manufacturer code, a known device class, a known version and a known communication protocol. The memory storage area 430 also contains a collection 445 of descriptive records about one or more farming operation land segments (FOLS) 450 that may or may not be directly or indirectly associated with the farming business. In some embodiments, for example, the collection 445 of FOLS descriptions 450 will include descriptions of all known FOLS in a particular zone, county, territory, state, country or region associated with the farming business. In other embodiments, the collection of FOLS descriptions 445 stored in the memory storage area 430 on the relay device 400 may include only those FOLS that are known to be encompassed by or connected to the particular farming business. The information in the FOLS descriptions 450 may comprise, for example, a latitude and longitude coordinates, elevation above sea-level, a description of the perimeter of the FOLS, a shape file for the FOLS, surface area measurements, global positioning coordinates, ownership status information property encompassed by the FOLS, zone and tract numbers for the FOLS, a farm number for the FOLS, a field number for the FOLS, one or more zoning classifications for the FOLS, the administrative county for the FOLS, a state administrative office for the FOLS, one or more designated common land units for the FOLS, or any combination of two or more thereof.

The memory storage area 430 in the relay device also stores one or more electronic farm records associated with the farming business operating the farming vehicle or farming implement upon which the message bus 475 is located. The electronic farm record 455 for the farming business includes general information about the farming business, as well as detailed descriptions for each farming operation carried out at the farming business, including, for example, information indicating the date, time and location of each farming operation, the type of farming operation (e.g., fertilizing, planting or pesticide spraying operations) and certain operating events that occurred during the performance of each farming operation. In preferred embodiments, the electronic farming record also includes precision farming data for each farming operation carried out at the farming business, including, for instance, the volume and type of fertilizer, pesticide, feed or seed used during the farming operation, the weather conditions during the farming operation, as well as all of the operating states, modes and operating parameters used by the farming implement during the farming operation, as reflected in the messages transmitted over the message bus by the farming implement and the farming vehicle while the farming operation is performed.

The application program 405 comprises programming instructions that, when executed by the microprocessor 420, will cause the microprocessor 420 to monitor the messages 480A-480N transmitted over the message bus 475, and automatically extract certain content from the messages 480A-480N in order to determine whether there is a match between the farming implement currently being used to perform the farming operation and one of the known farming implements 440 in the collection of implement profiles 435. As will be described in more detail below, if a match is found, for example, when the application program determines that an address claim message in the messages 480A-480N transmitted over the message bus 475 contains a manufacturer code and a device class that match the known manufacturer code entry and the known device class entry, respectively, in one of the implement profiles in the collection of implement profiles 435, and the object pool version in an object pool version message transmitted over the message bus 475 matches the known version entry in the same implement profile. After a match is found, the application program uses the known communication protocol for the matching farming implement profile to interpret subsequent messages transmitted or broadcasted over the message bus 475. In particular, the application program uses the known communication protocol to extract the contents of subsequently transmitted messages, and then uses the extracted content and the position and time signals received by the GPS receiver to determine a set of operating parameters and operating events that occur during performance of the farming operation. As previously stated, examples of an operating events may include events such as activating and deactivating the implement, activating and/or deactivating certain nozzles or row units on the implement, receiving a signal or instruction from the farming vehicle, a transmission by the implement of a signal representing a low-feed, low-fuel or power-fail condition, an increase or decrease in volume or pressure readings, etc. The application program also compares the position information (such as longitude and latitude coordinates) received by the GPS receiver 410 during the performance of the farming operation to location information (such as longitude and latitude coordinates) stored in the collection of FOLS descriptions 445 to determine which FOLS described in the collection of FOLS descriptions is the FOLS where the farming operation is carried out. The position and time information received by the GPS receiver 410, in conjunction with the operating events, also enables the application program 405 to determine the exact travel path for the farming operation. All of this information, including the type, location and travel path for the farming operation, is written to the electronic farming record 455 for the farming business. The relay device 400 will then transmit the electronic farming record information to the farming data exchange system 500 via the network interface 425. In preferred embodiments, the relay device 400 may also have one or more additional application programs configured to format at least a portion of the updated electronic farming record to a mobile device (not shown in FIG. 4) capable of formatting and displaying maps and travel paths for the farming operations.

Figure 5:
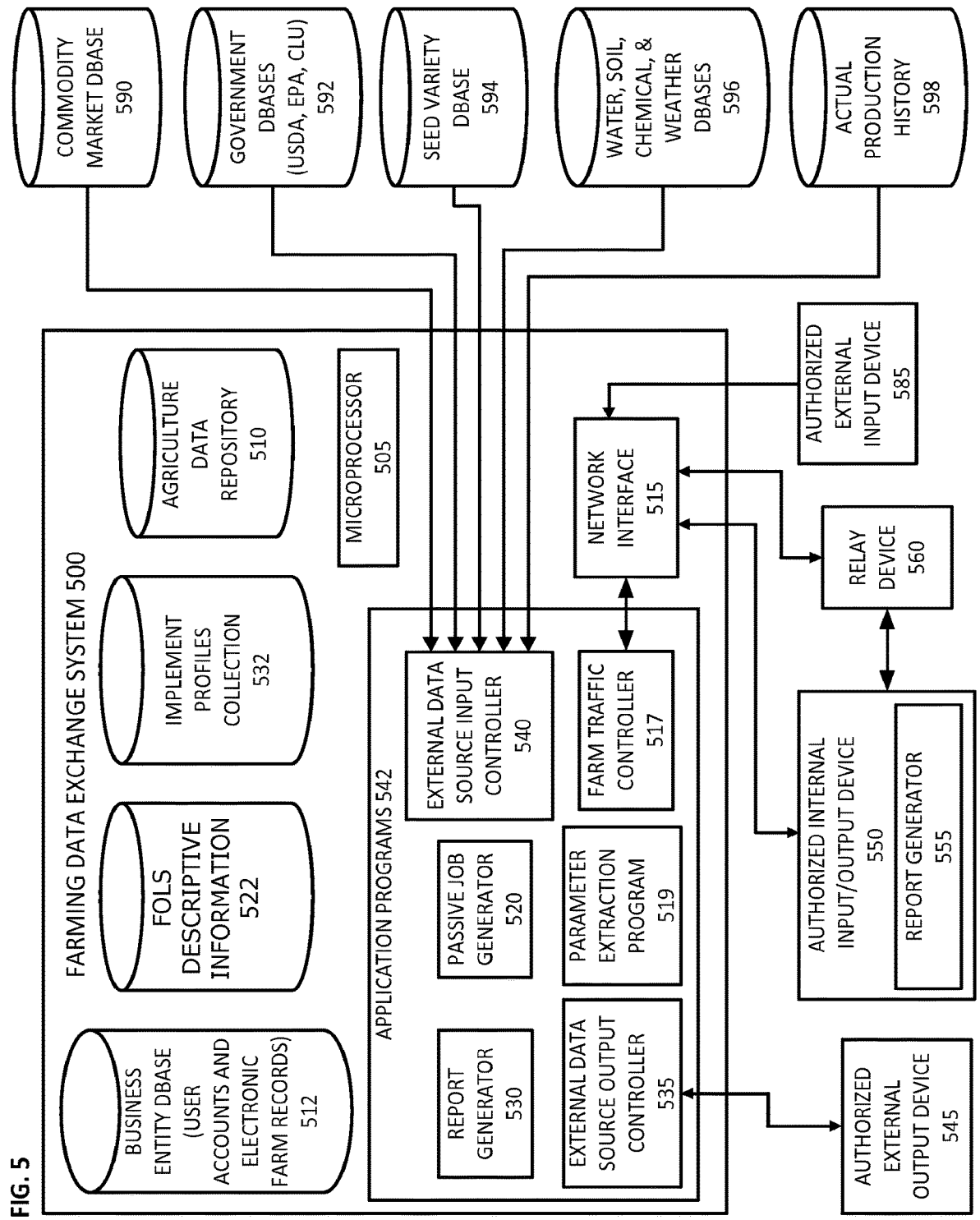
FIG. 5 shows a high-level block diagram for a farming data exchange system arranged to operate in accordance with one embodiment of the present invention.

FIG. 5 shows a high-level block diagram for a farming data exchange system 500 arranged to operate in accordance with one embodiment of the present invention. As shown in FIG. 5, the farming data exchange system 500 includes a microprocessor 505, a first data store 512 for storing a business entity database comprising user account and an electronic farming record for a farming business, a second data store 522 for storing descriptive information about a farming operation land segment associated with the farming business, and a third data store 532 for storing an implement profile defining the known manufacturer codes, known device classes, known versions and known communication protocols for a collection of known farming implements. The farming data exchange system also includes a network interface 515 configured to receive message data, position data and time data acquired by a remote relay device 560 connected to a farming vehicle or farming implement (not shown in FIG. 5) while the farming vehicle and farming implement are used to perform a farming operation at the farming business.

The application programs 542 contain computer-readable program instructions that, when executed by the microprocessor, will cause the microprocessor to carry out a number of steps associated with receiving and processing message data generated by a farming vehicle and farming implement during performance of a farming operation, including without limitation identifying a communications protocol for the farming implement used to perform the farming operation, extracting operating parameters and global positioning data from the message data, parsing the operating parameters and global positioning data to determine a set of operating events for the farming operation, and then using the operating events and the global positioning data to determine a travel path and a FOLS for the farming operation.

In particular, the application programs 542 running on the farming data exchange system 500 includes software programs that automatically extract implement information, such as the manufacturer code and device class, from an address claim message in the message data received from the relay device 560 and determine if they match a known manufacturer code and a known device defined by one of the implement profiles in the implement profiles collection data store 532. If there is a match, then the application program 542 will next extract an object pool version from an object pool message in the messages received from the relay device 560 via the network interface 515 and determine whether it matches the known object pool version in the implement profile. If the object pool version matches the known object pool version, then the application program will use the known communication protocol defined by the selected matching implement profile to parse and interpret the content of subsequently transmitted messages. The extracted content, the position data, the time data and the known communication protocol defined by the implement profile for the known farming implement are then used by the application program 542 to determine a set of operating events and a travel path for the farming operation that generated the messages captured by the relay device 560. The application program will also use the set of operating events, the travel path and the FOLS descriptive information 522 to identify the farming operation land segment (FOLS) where the farming operation must have occurred. Finally, the application program 542 will record the farming operation, the operating events and descriptions for the travel path and the FOLS in the electronic farm record for the farming business in business entity database 512.

As shown in FIG. 5, the farming data exchange system also includes other application programs and controllers, including an external data source output controller 535, a passive job generator 520, a report generator 530, a farm traffic controller 517, a parameter extraction program 519 and an external data source input controller 540. The external data source input controller 540 is communicatively connected to variety of different database sources 590, 592, 594, 596 and 598 useful for processing the messages and position information received from the relay device 560. An authorized external input device 585 and an authorized external output device 545 are also communicatively coupled to the farming data exchange system 500 to facilitate adding or removing additional agricultural data to the system. An authorized internal input and output device 550 and report generator 555 permits communications with and displaying of maps and travel paths on mobile devices, such as tablet computers and handheld smartphones.

The parameter extraction program 519 receives and parses messages transmitted from the relay device 560 to the farm data exchange system 500 in order to detect and identify the implement electronic control unit (ECU) that generated those messages. The data in the NAME field of one of the messages is extracted and compared with the data in a collection of implement profiles 532 stored on the system. These implement profiles in the collection of implement profiles 532 provide a mapping between ECU parameters and ISO 11783 Virtual Terminal object numbers. Thus, once the parameter extraction program 519 determines that there is a match between the data in the NAME field transmitted by the current implement and the data stored in one of the stored implement profiles, all of the object numbers that will be used by the current implement to communicate information to the current farming machine are known to the system by virtue of this mapping. Accordingly, the parameter extraction program 519 can then use the implement profile (specifically, the mapping of object numbers to operating parameters) to extract operating parameter values from every subsequent message transmitted by the current implement. The operating parameter information, along with the position and time data provided by the GPS receiver, can then be used by the other application programs to determine the set of operating events that occurred during the farming operation.

Typically, an agriculture data repository 510 is included to store raw data as it is received by the farming data exchange system 500. Raw data may be received from a number of external sources, such as authorized external databases 590, 592, 594, 596 and 598. The data could also be received from farming equipment via the network interface 515 and farm traffic controller 517, both configured to permit the system to receive such information directly from a farming business. The external data source input controller 540 is a management point for all of the external data sources 590, 592, 594, 596 and 598 authorized to either push data directly into the database, or pull data out of the database. Typically, data gets routed by the external data source input controller 540 into the appropriate data structures inside the agriculture data repository 510.

Typically, the external data source input controller 540 is implemented as an application programming interface (API) designed specifically for transferring data from the external data sources 590, 592, 594, 596 and 598 to the agriculture data repository 510. Several examples of external data sources are shown in FIG. 5. For example, there are water, soil, chemical and weather databases 596 that provide historical water, soil, chemical and weather data. The weather information in this database could be provided, for example, by establishing interfaces with established weather data providers, such as NOAA. The soil database provides access to soil sampling data, including chemistry records for various types of soil. This information may be collected and managed by states, counties or farmers. Every state requires registration and documentation for public wells. Therefore, preferred embodiments of the farming data exchange system 500 of the present invention will also include one or more interfaces to one or more state- or county-operated water well registration databases, which will provide the chemical composition of local water sources.

The water, soil, chemical and weather databases 596 also provides very specific information about the types of chemicals, their names, their chemical compositions, their manufacturers, their application rates and their data safety sheets. With this information, the farming data exchange system will have deep and rich information about the specific chemicals that are being applied to a field during a farming operation, thereby enriching the information associated with the FOLS. The system may also be configured to provide an external connection to a network of data processing systems operated and managed by agencies related to the USDA or the EPA.

An actual production history database 598 provides historical production data for farming land registered with government agencies related to the USDA. An interface to a commodity and market database 590, such as those operated by the Chicago Board of Trade (CBOT), provides commodity exchange and local market pricing information. An interface to the FSA's CLU data layer (database) 592 provides access to official polygonal shape files for farming land. The system may also be configured to establish an electronic communication with and pull data from the data processing systems of one or more soil laboratories that are performing the soil sampling. Preferably, an interface with a seed variety number database 594 is also provided. There are a number of different chemical companies that are also in the hybrid seed business and genetics business. Every bag of seed is required to have a seed variety number on it. The system of the present invention will use this interface to track seed variety numbers for the seed varieties being used for the farming operations on the FOLS.

The system may also be configured to receive input from authorized external input devices 550. For example, an agronomy program developed by a third party may be permitted to export prescription maps into the agriculture data repository. Authorized external input devices 550 may also include smartphones, laptops, tablets and external online servers, all configured to permit specific customers to access and provide input into the agriculture data repository 510 via authorized business and personal accounts on the farming data exchange system 500.

The passive job generator 520 monitors positioning data, machine data, implement data, business data, personal data, relay device data and tokens received on the farming data exchange system 500 and stored in the agriculture data repository 510, detects a common identifier in all these types of data, such as a farming operation identifier and a farming business identifier, and uses the farming operation identifier and farming business identifier to create new electronic farming records for the farming business.

For example, the passive job generator 520 may be configured to identify all of data in the agriculture data repository 510 tagged with a same farming operation ID. The farming operation ID gets generated by the relay device 560, which was described in more detail above with reference to FIG. 1. Then that data is stored, and the passive job generator 520 looks for that common thread, and stiches all of the pieces of data together to create an electronic record for the new farming operation. The farming operation record might include operating events spanning multiple days, because it might take multiple days to plant a field with corn. But to the farmer, viewing the information for the entire farming operation, even when the farming operation spans multiple days, is the most meaningful way to look at the data. The system still keeps all of the data separate in terms of the individual FOLS, but when a farmer or data customer looks at the data, they are usually interested in seeing the overall job (i.e., farming operation) of planting corn on/over a number of FOLS. The passive job generator 520 stiches all of the data together to deliver more meaningful information to the electronic farm record for the farming business.

If a farmer uses the same piece of equipment and returns to the same field and covers the same ground again (perhaps to replant seeds in a low-lying area where a flood washed away previously-planted seeds, for instance), the passive job generator 20 may amend an earlier-created electronic farm record in the business entity database 512 to include the additional data created by his second visit to the field in order to generate a more complete record and/or increase the size of a travel path associated with the farming operation. If the farming implement is the same, and the seed variety is the same, and the driver is the same, the farming data exchange system 500 may be preprogrammed, in some embodiments, to assume the second visit to the field comprises a continuation or completion of a previously started farming operation. In other embodiments, the system may be preprogrammed to classify the second visit as a new farming operation.

The business entity database 512 stores all of the account information and farming data related to a specific farming business, including the electronic farm record or records for the farming business. There may be multiple field records or job records or task records collected in the business entity database 512. In order for this information to be accessed and reported in meaningful ways, the business entity database 512 can be queried from a number of different sources. The business entity database 512 is basically a data store for all of the data that is relevant to a specific farming business. And a significant aspect of the value of the farm data exchange system 500 is its ability to create, share and distribute reports to authorized users and subscribers. The report generator 530 is an example of one application program that can query the business entity database 512 and collect information that can be pushed down to an authorized internal input/output device 550 in the form of a custom report. The farm traffic controller 517 is another example of a computer program that can query the business entity database 512 for data that can be formatted into customized reports and pushed out to authorized users and subscribers.

The authorized external output device 545 is any external device that has been given authorization to view data stored in the databases of the farming data exchange system 500. Typically, this device will only view the farming data, not change it. An external data source output controller 535 ensures that the authorized external output device 545 is actually authorized to receive reports on the requested farming data. An API is used to pass a query containing variables through the report generator 530. The report generator 530 then grabs those variables, converts them into a visual format that is meaningful, and then passes that information back out to the external data source output controller 535. The external data source output controller 535 checks to make sure that the authorized external output device 535 is still connected (i.e., that the session is still active), that the device is still authorized to receive report, and then passes that report to the authorized external output device 545.

The authorized internal input/output device 550, such as a mobile phone, a mobile tablet, laptop, or other device with a cellular connection, may be used to transmit and receive farming data to and from the farming data exchange system 500. All of these devices may be configured to run software optimized to provide visually pleasing and impactful reports for the platform.

If a user is utilizing a tablet computer, such as an iPad or an Android tablet, or a Windows mobile tablet computer, for example, there are a number of tools available that render high-resolution color images and reports specifically for those platforms. But the user may also request and download reports that are rendered instead on the farming data exchange system 500. In this case, the report generator 530 sends a request for that data to the farm traffic controller 517, which validates the user's credentials and the device, and then queries the business entity database 512, or retrieves the electronic farm record for a specific farming business from the business entity database 512, and funnels that data back to the report generator 530, which then converts the data into an aesthetically pleasing display format for the tablet computer.

The relay device 560 may communicate with the farming data exchange system 500 through the authorized internal input/output device 550 (such as an iPad), or it can communicate via a cellular communications channel using a cellular radio transmitter/receiver inside the relay device 560. Preferably, the relay device 560 is configured to try communicating with the farm traffic controller 517 via whichever communications channel is most readily available. Thus, if the cellular connection is down, then the relay device is configured to push and pull data through the authorized internal input/output device 550, which then passes it through the farm traffic controller 517 to the agriculture data repository 510.

The relay device is 560 is connected to the controller area network (not shown in FIG. 5) on the farming vehicle or farming implement so as to permit the relay device 560 to receive engine or machine data, implement data, and variable rate data while the vehicle and machine are being used to perform a farming operation. The relay device 560 is also connected to a global positioning antenna (not shown) on the farming vehicle or farming implement so that the relay device 560 can receive global positioning data while the farming farming vehicle and farming implement are being used to perform the farming operation. Implement data may include data such as the implement width and the number of rows, the row width, row depth, the down-pressure, singulation, spacing and population (if the implement is a planter). If the farming implement is a sprayer, for instance, then the implement data will include nozzle information, such as the number of nozzles on the implement, the flow rate for each nozzle, and whether the nozzles have solenoids to turn on and off. All of the information for the implement is going to be received by the relay device 560 via the relay device's connection to the controller area network, or CAN.

Preferably, the relay device 560 has a built-in global positioning receiver that permits it to receive and process satellite signals detected via an external antenna. The relay augments the farming vehicle and farming implement data it receives from the CAN with global positioning data received with the satellite signals. This external antenna may be configured to receive satellite signals from a variety of different satellite arrays, including without limitation GLONASS, COMPASS, EGNOS and GPS. The relay device 560 parses the NMEA sentences into meaningful position data, including for example latitude, longitude, attitude, altitude and time data. The global position data, machine data and implement data are all used to paint the path and the ground that the machine and implement are covering.

In some embodiments, the relay device 560 includes a software program containing programming instructions that, when executed by a microprocessor 505 inside the relay device 560, will cause the microprocessor 505 to identify a travel path for the farming operation. Thus, as a farmer is out performing a farming operation in one of his fields using a particular vehicle and implement, the software program uses the operating parameters received from the CAN and the global position data received from the antenna, to paint a picture representing the surface area of the land covered by the vehicle and the implement during that farming operation while the farming implement was in an active state. The relay device 560 transmits all of the position data, machine implement data, the travel path data and the FOLS description to the farm traffic controller 517, which knows where to funnel it into the agriculture data repository 510. Alternatively, the relay device 560 could be configured to transmit the raw operating parameter and global positioning data to the farming data exchange system 500 so that the farming data exchange system 500 can use the data to identify the travel paths and the FOLS. Thus, identification of the travel paths and FOLS may be carried out on the relay device 560 in some embodiments, while in other embodiments, the identification is carried out on the farming data exchange system 500. Both of these approaches are intended to fall within the scope of the claimed invention.

Message Content Extraction Process

Most modern farming implements provide an electronic control unit (ECU) that communicates with other machines via a CAN (controller area network) bus in accordance with an industry standard specification, referred to as ISO 11783, or ISOBUS. ISO 11783 defines a virtual terminal (VT) as a means of providing a graphical display and input functions for an operator to interact with an implement or group of implements. In particular, An ISOBUS compliant implement defines what will be displayed, how the display will look, and how the operator may interact by providing an object pool to the terminal. It is important to note the ISO 11783 specification defines the graphical objects, but not what they represent. In this way, different types of implements can provide an interface on any terminal that supports the standard. However, the VT interface requires visual interpretation by an operator. The graphical objects passed from the implement to the VT have no meaning until they are assembled in a display terminal and interpreted by a human operator.

The present invention provides a system and method for creating implement profiles that can be used by application programs running on the relay device or the farm data exchange system to passively extract desired operating parameters from ISOBUS messages, as well as a system and method for using those operating parameters, along with position and time information provided by GPS receivers, to determine operating events occurring during farming operations. In general terms, a parameter extraction program, such as parameter extraction program 519 in FIG. 5, monitors data on the ISO 11783 bus (ISOBUS). ECUs attached to the ISOBUS are detected and identified from the information presented in the ISO 11783 NAME field of the ECU's address claim message and the version field of the Get Version messages exchanged between the virtual terminal and the ECU for the farming implement. The data in the ECU NAME field is used to identify the ECU as belonging to a particular implement manufactured by a particular manufacturer. The data in the NAME field is extracted and compared with the data in a collection of implement profiles stored on the system. These implement profiles provide a mapping between desired ECU parameters and ISO 11783 Virtual Terminal object numbers. Thus, once the parameter extraction program determines that there is a match between the data in the NAME field transmitted by the current implement and the data stored in one of the stored implement profiles, all of the object numbers that will be used by the current implement to communicate information to the current farming machine are known to the system by virtue of this mapping. Accordingly, the system can now use the implement profile (specifically, the mapping of object numbers to operating parameters) to extract operating parameter values from every subsequent message transmitted by the current implement. The operating parameter information, along with the position and time data provided by the GPS receiver, can then be used by the application programs to determine the set of operating events that occurred during the farming operation.

Figure 6:
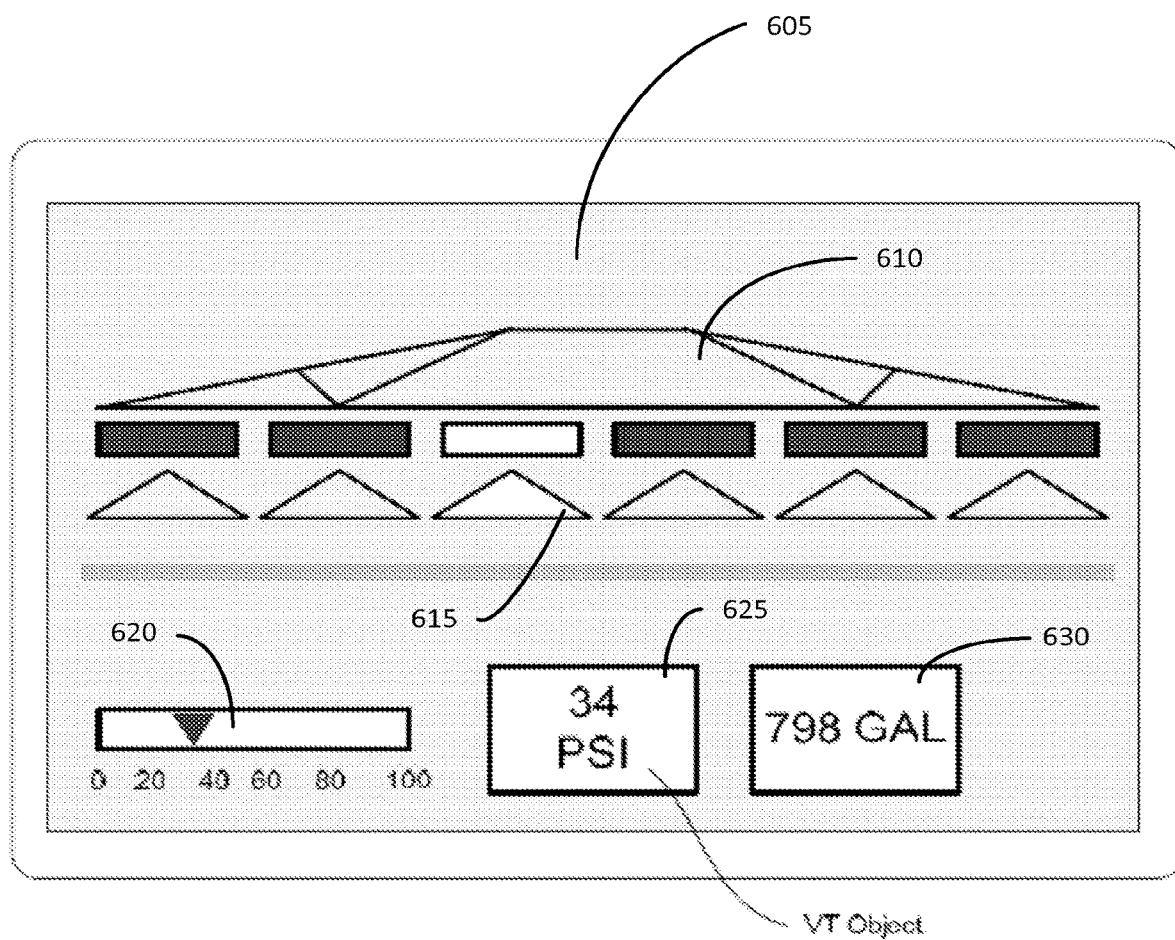
FIG. 6 shows an example of a virtual terminal (VT) display screen.

FIG. 6 shows an example of a virtual terminal (VT) display screen 605. In this case, the display screen 605 shows a collection of polygonal shapes and numbers representing or corresponding to the current operating parameters for a spraying implement 610. Each graphic element on the display screen 605 is referred to as a VT object. A displayed number may be an object number of interest because it is associated with an operating parameter of the ECU providing the graphic element to the VT display screen. For example, two pressure indicators 620 and 625 displayed on the display screen 605 show that one of the nozzles 615 on the sprayer 610 is currently operating at 34 PSI, while a spray volume indicator 630 shows that nozzle 615 of sprayer 610 has dispensed a total of 798 gallons of spray.

Figure 7:
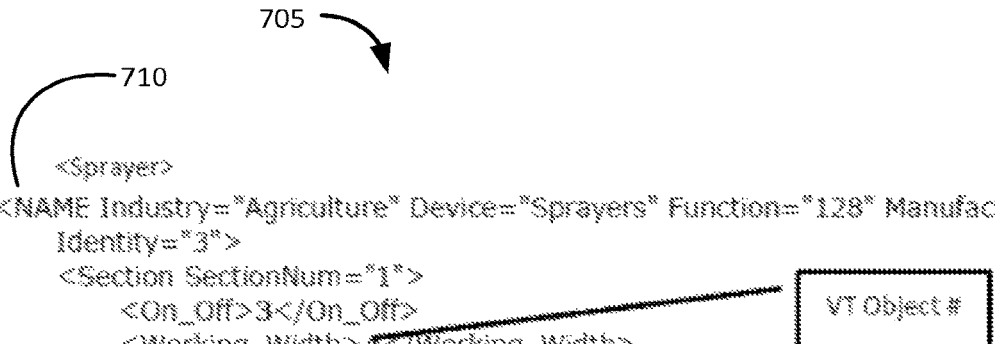
FIG. 7 shows an example of an implement (or ECU) profile in XML format.

FIG. 7 shows an example of an implement (or ECU) profile 705 in XML format. As indicated by the values in the NAME field 710, this particular implement profile is for a "sprayer" manufactured by the "Deere" company. As shown in FIG. 7, the profile includes a host of important current operating parameters, as well as the VT object numbers used by the sprayer to signal those parameters. In this case, the operating parameters include, for each section of the sprayer, an on/off status, a working width and a Y-offset. The implement profile 705 also shows operating parameters for the "BOOM," which are target rate, application rate, master valve on/off status, total volume applied and total area sprayed.

Figure 8:
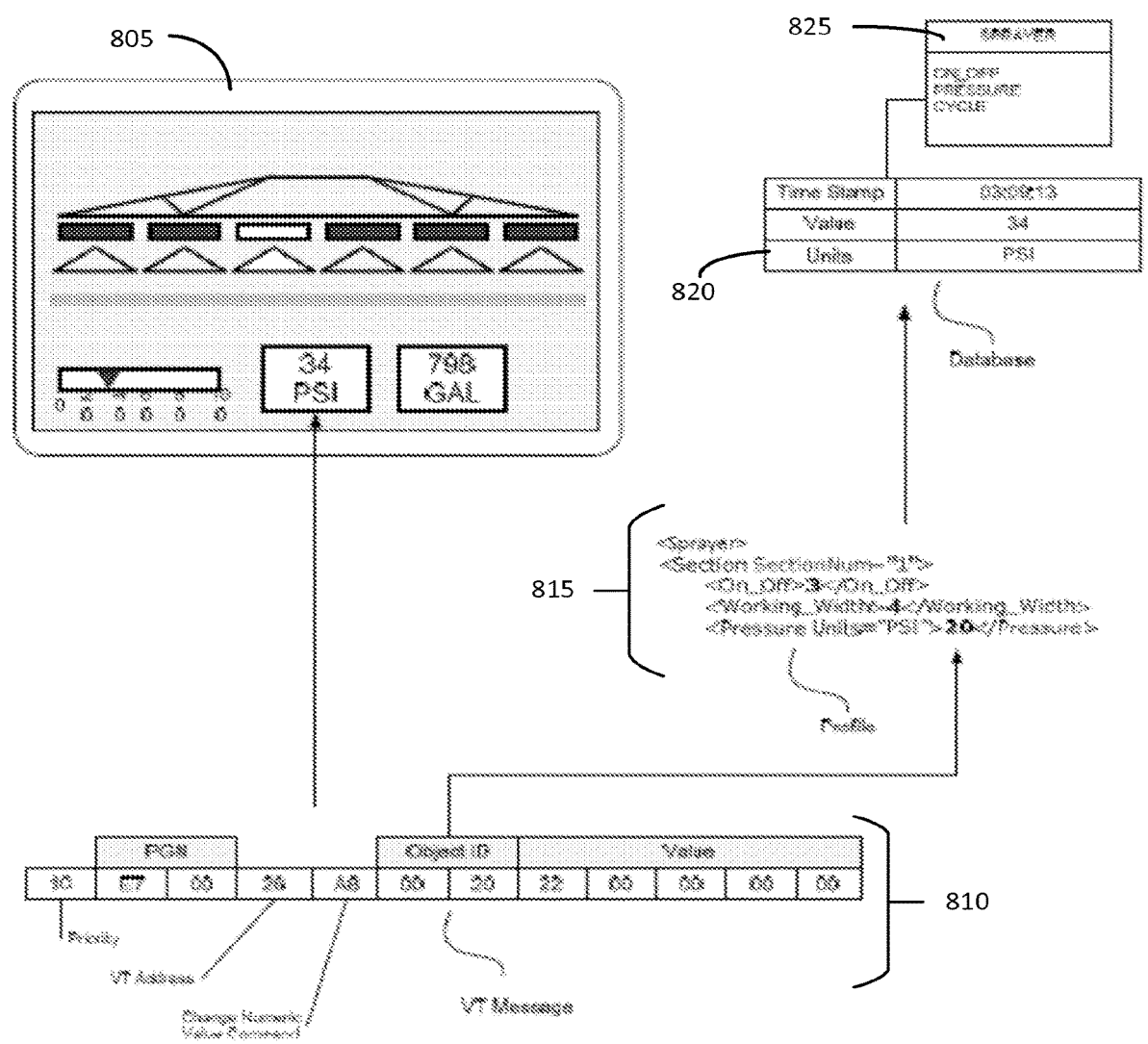
FIG. 8 shows a diagram illustrating, by way of example, the relationship between the VT display screen, a VT object message, the corresponding ECU (implement) profile data, and the operating parameters that are stored in the database on the farming data exchange system.

FIG. 8 shows a diagram illustrating, by way of example, the relationship between the VT display screen 805, a VT object message 810, the corresponding ECU (implement) profile data 815, and the operating parameters 820 and 825 that are stored in the database on the farming data exchange system based on the values transmitted to the VT display screen 805 and the values in the VT message 810.

Figure 9:
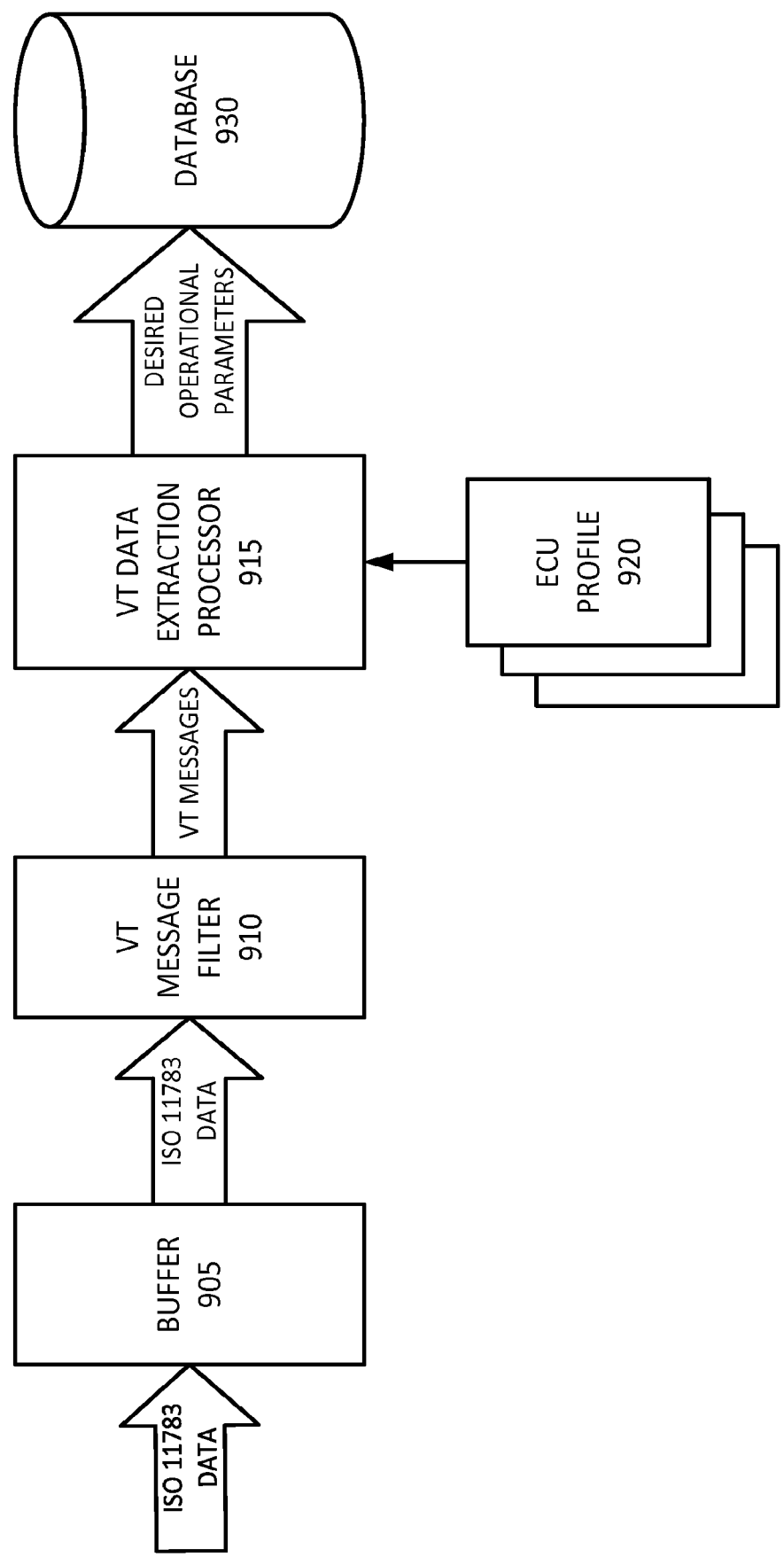
FIG. 9 contains a high-level flow diagram illustrating the primary steps of an exemplary algorithm for processing message data transmitted on a message bus in accordance with one embodiment of the present invention.

FIG. 9 contains a high-level flow diagram illustrating the primary steps of an exemplary algorithm for processing message data transmitted on a message bus in accordance with one embodiment of the present invention, and how the operating parameters are derived from the contents of the message data. First, at step 905, message data carried on an ISO 11783 compliant message bus is buffered into a memory storage area on the relay device or the farming data exchange system. At step 910, the message data is filtered to remove messages that are not virtual terminal (VT) messages. Then, in step 915, the VT messages are fed into the extraction processor, which extracts operating parameters from the VT messages based on the ECU profiles 920 stored in the memory of the relay device or farming operation exchange system. The extraction processor extracts the desired operational parameters from the VT messages by mapping the VT objects within the VT messages to a recognized ECU profile for the farming implement. The operational parameters are stored in a database 930 related to the particular ECU for the particular implement.

Figure 10:
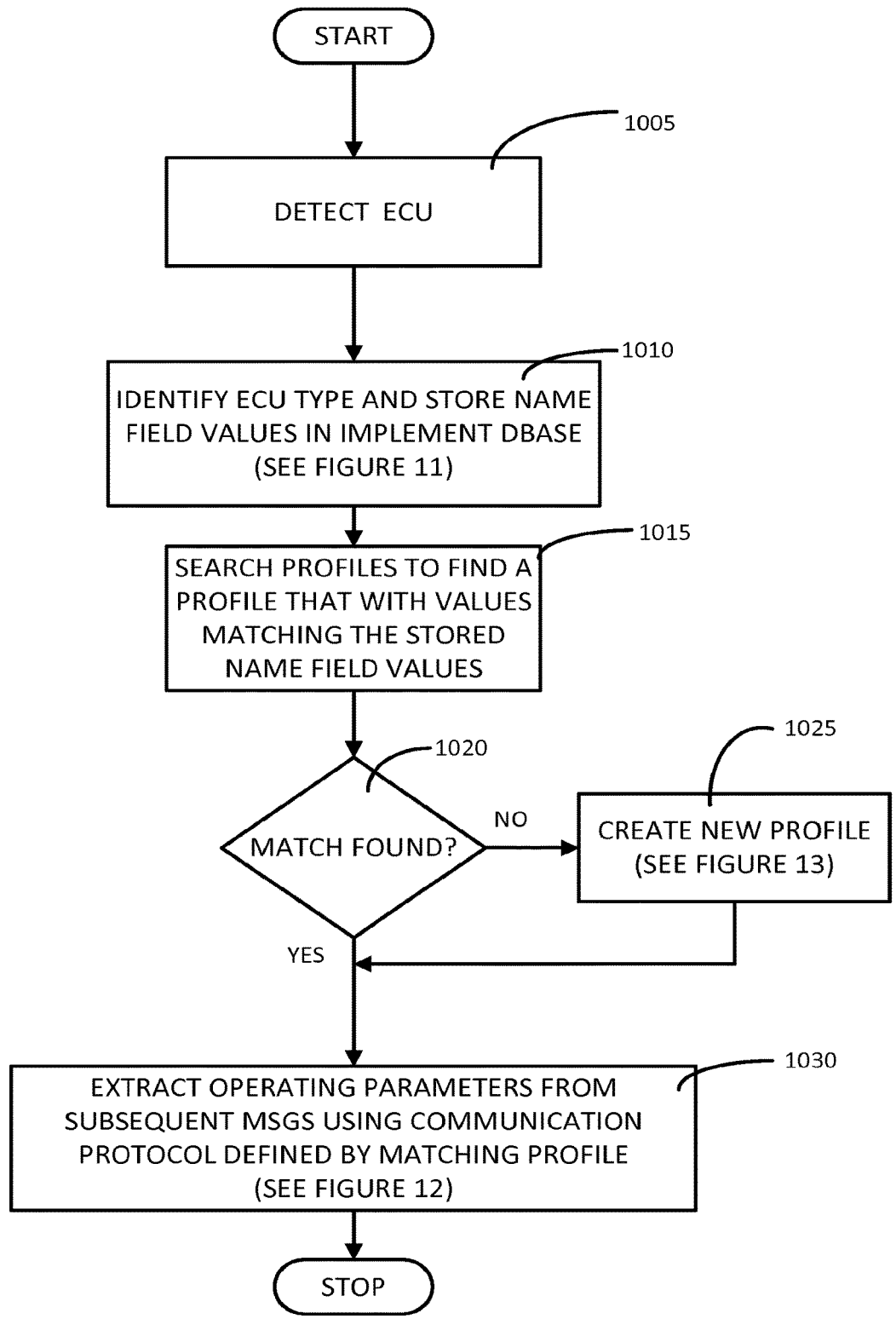
FIG. 10 contains a high-level flow diagram illustrating the steps for detecting and extracting operating parameters from messages in accordance with one embodiment of the present invention.

FIG. 10 contains a high-level flow diagram illustrating the steps for detecting and extracting operating parameters from messages in accordance with one embodiment of the present invention. First, in step 1005, the system determines whether an implement ECU is present. Next, in step 1010, the system identifies the current implement ECU based on the contents of two particular types of messages in the message data (i.e., an address claim message and version message), as shown in more detail in FIG. 11. Next, in step 1015, name and version values in the collection of implement ECU profiles stored in memory are compared with the name and version values in the messages in order to identify the ECU implement profile that matches the current implement ECU. If a match is found (step 1020) then the system can use the matching implement profile to extract operating parameters from subsequent messages. See step 1030. On the other hand, if no match is found in step 1020, (i.e., no matching profile exists), then a new profile can be created for the implement ECU currently in use (step 1025).

Figure 11:
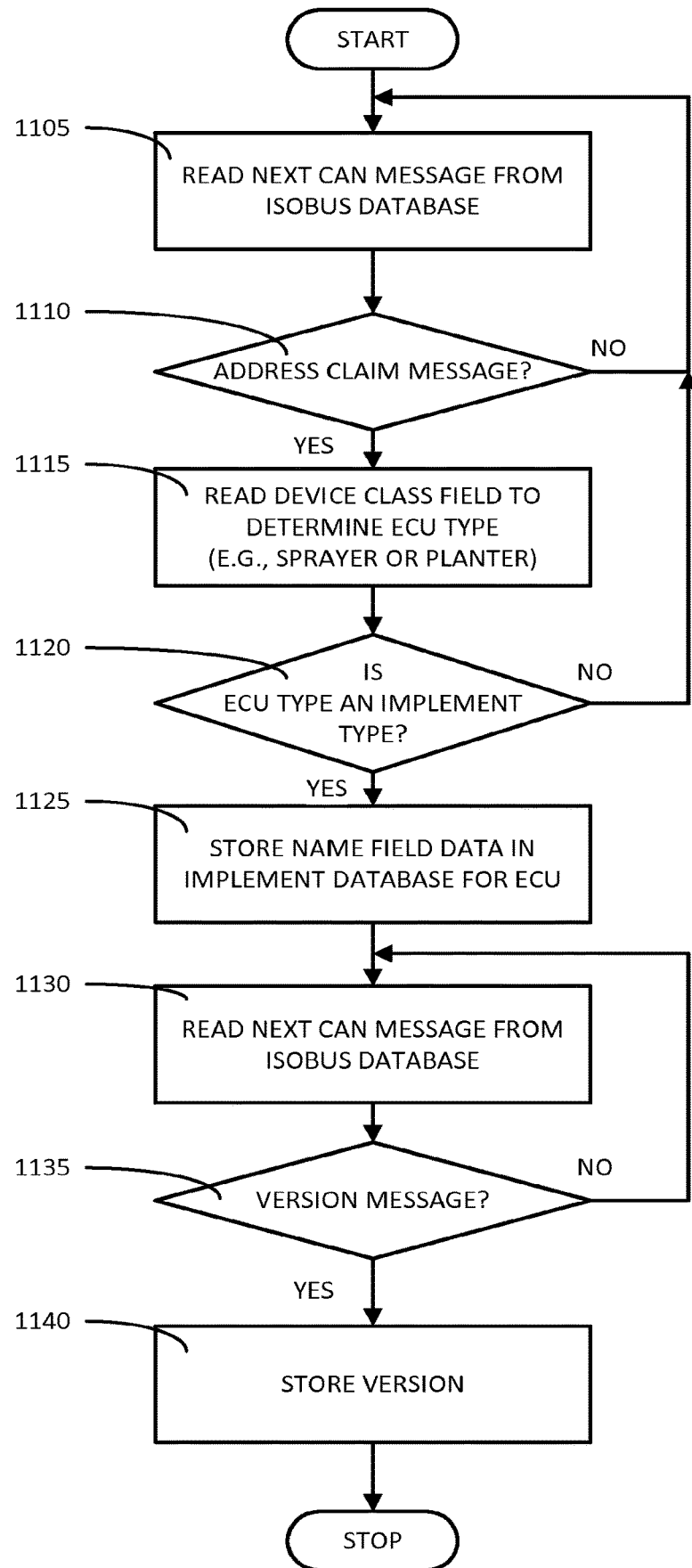
FIG. 11 shows a flow diagram illustrating the ECU detection process in an exemplary embodiment of the present invention.

FIG. 11 shows a flow diagram illustrating the ECU detection process in an exemplary embodiment of the present invention. Typically, the steps in FIG. 11 are carried out by a parameter extraction program, such as parameter extraction program 519 in FIG. 5, running on the farming data exchange system. In step 1105, an ISO 11783 message is read from memory. Next, in step 1110, the message is checked to determine if it is an address-claim message. If the message is not an address-claim message type, then processing returns to step 1105 to read the next message from memory. However, if the message is identified as an address-claim message in step 1110, then the DEVICE CLASS field of the NAME portion of the message is read (step 1115) to determine the ECU type (e.g., a sprayer or a planter). If the ECU type indicates that the ECU is an implement (step 1120), then, in step 1125, the value in the NAME portion of the address-claim message is stored in memory. In steps 1130, 1135 and 1140, the system reads the next message from the message bus, determines whether that message is a version message, and if so, stores the version in memory.

Figure 12:
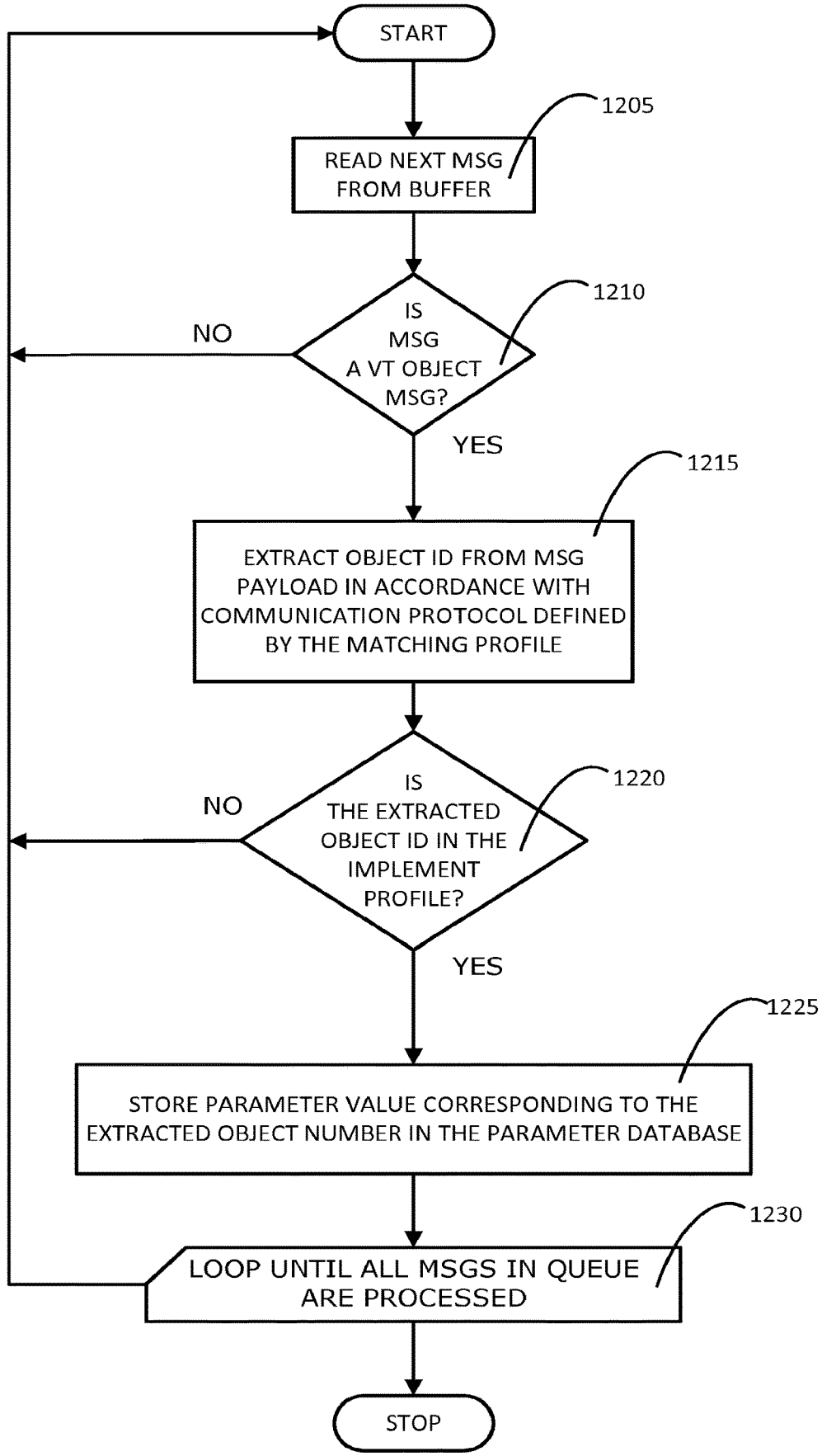
FIG. 12 contains a high-level flow diagram illustrating the steps performed to extract operating parameters from ISO 11783 Bus message data in accordance with one embodiment of the present invention.

FIG. 12 contains a high-level flow diagram illustrating the steps performed to extract operating parameters from subsequently received messages after the NAME field and version values are extracted and stored for a particular implement ECU, and an implement ECU profile matching that NAME and version are identified, in accordance with one embodiment of the present invention. Typically, the steps in FIG. 12 are also carried out by a parameter extraction program, such as parameter extraction program 519 in FIG. 5, running on the farming data exchange system. As shown in FIG. 12, in step 1205, a subsequent message is read from the memory buffer by the parameter extraction program. In step 1205, the parameter extraction program parses the message to determine whether the message contains a VT object message. If a VT object message is identified, then the object ID is extracted in accordance with the communication protocol defined by the matching implement profile, and this extracted object ID is then compared with the object ID numbers stored in the selected matching implement ECU profile (step 1220). If the answer is "yes," then, in step 1225, the data portion of the VT object message is stored in a database for that particular operating parameter associated with that particular implement ECU. Next, in step 1230, unless all of the messages have been read from the buffer and processed, the system will loop back to step 1205 to begin reading and processing the next message.

Figure 13:
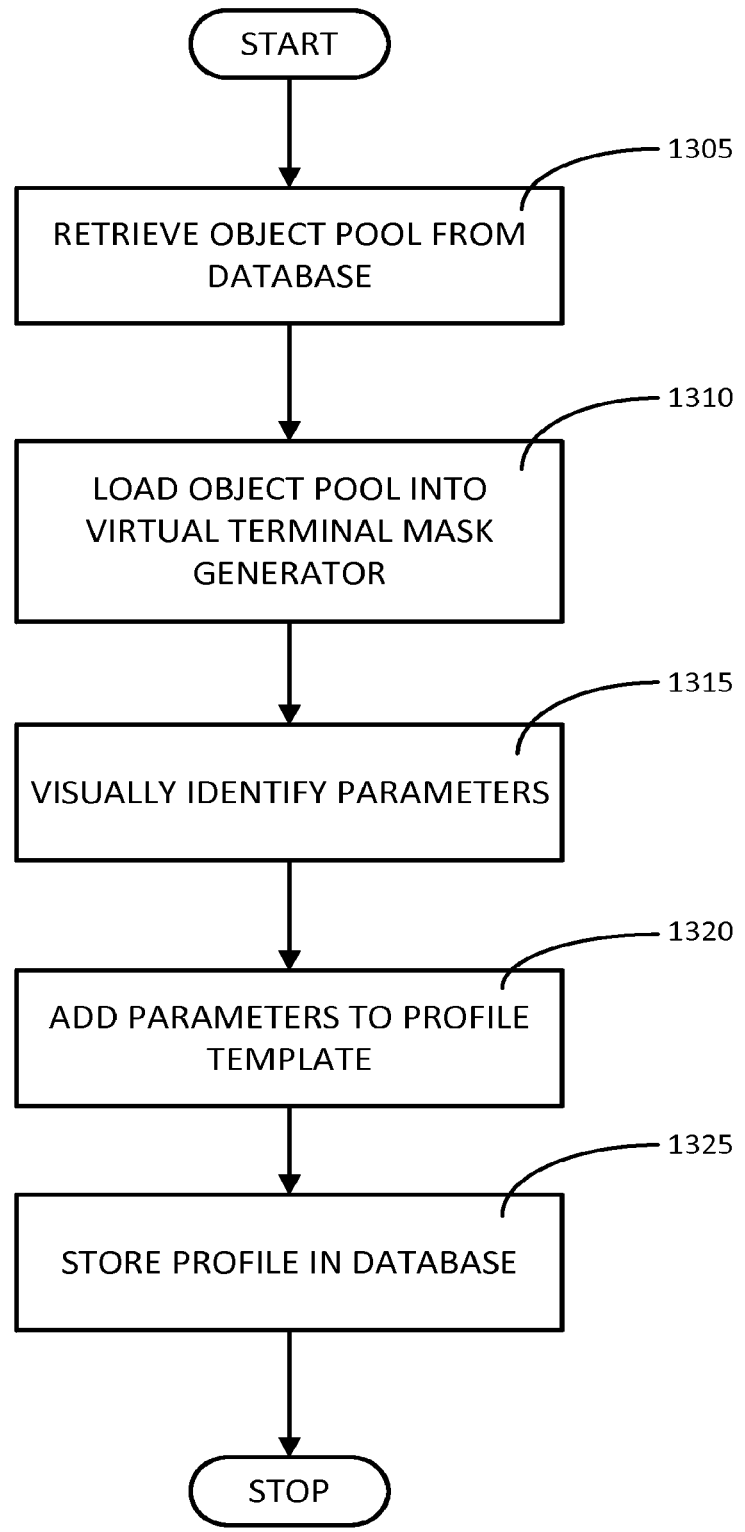
FIG. 13 shows a flowchart illustrating the implement ECU profile creation process according to one embodiment of the present invention.

FIG. 13 shows a flowchart illustrating the implement ECU profile creation process in accordance with one embodiment of the present invention. First, in step 1305, a VT object pool for the implement ECU of interest is retrieved. The object pool could be assembled from messages already stored in memory, or the object pool could be obtained from the ECU manufacturer, or by some other means. In step 1310, the object pool is uploaded to a VT simulator. For example, the VT simulator could be a PC program that displays the VT objects on a VT display screen. As an additional aid, the VT simulator could display the object ID numbers for easy identification. In steps 1315 and 1320, a human observer identifies the operating parameters of interest within the terminal objects displayed on the VT display screen, and adds the corresponding VT object ID numbers to an ECU profile template. Other identifying features may also be added to the ECU profile template, including the type of object (number, button, text, etc.). Finally, in step 1325, the populated implement ECU template is stored in memory as a complete implement ECU profile, ready to be matched with implement ECUs being used to perform farming operations.

Figure 14:
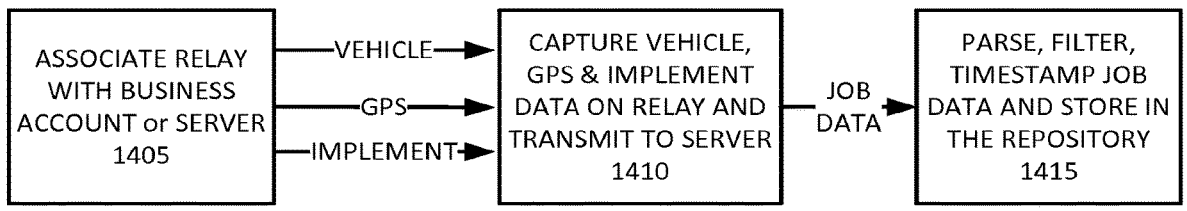
FIG. 14 shows three flow diagrams illustrating by way of example the first three phases of a process for managing and processing farming operation data on a farming data exchange server in accordance with one embodiment of the present invention.
Figure 14:
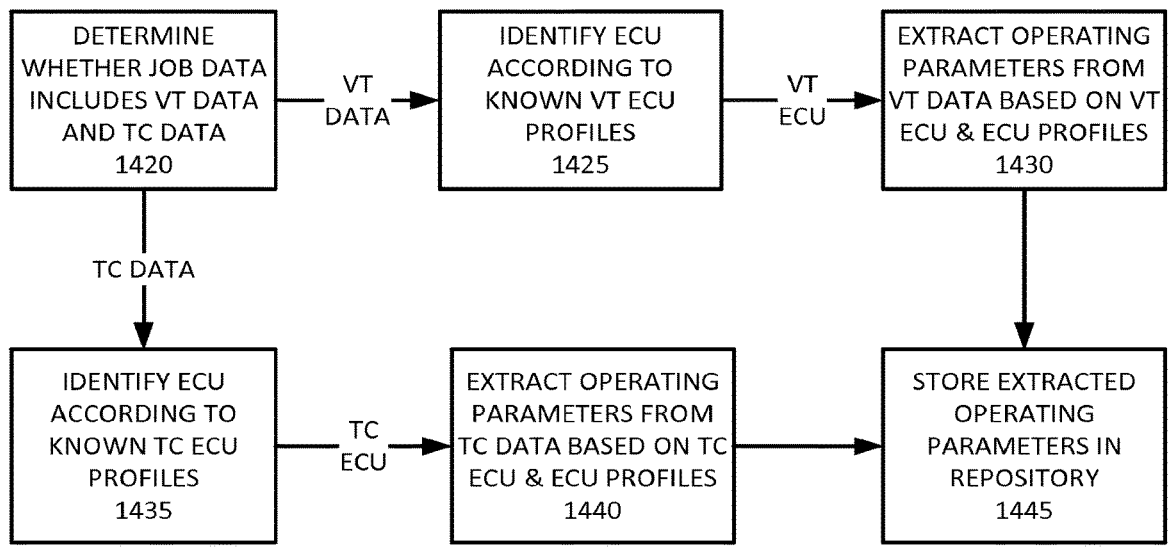
Figure 14:
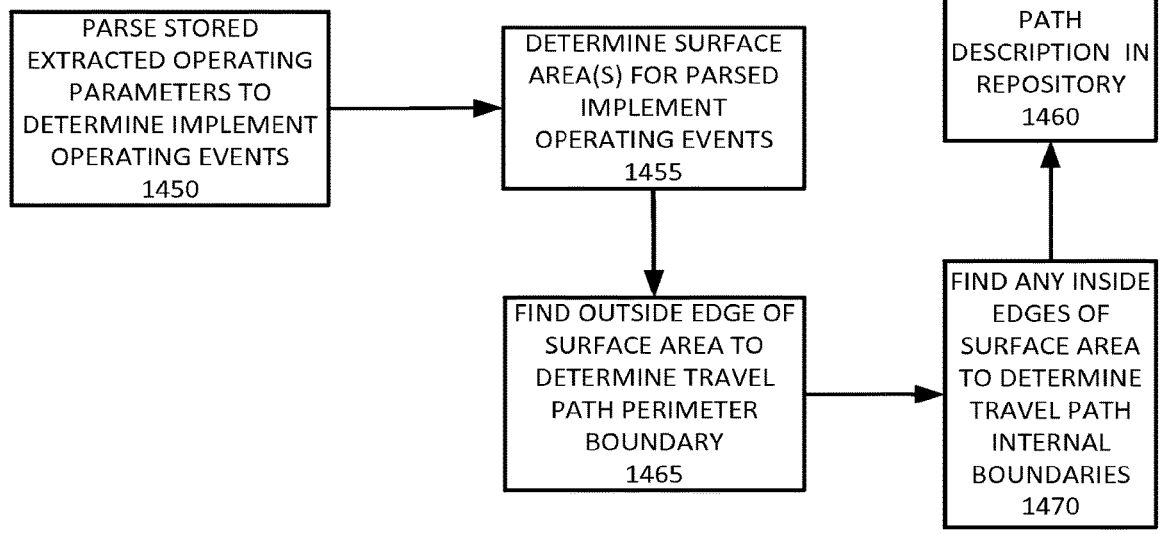

FIG. 14 shows three flow diagrams illustrating by way of example the first three phases of a process for managing and processing farming operation data on a farming data exchange server in accordance with one embodiment of the present invention. As shown in FIG. 14, the first phase is the passive job data acquisition phase, which comprises the steps of associating a relay device with a business account on the farming data exchange server (step 1405), capturing vehicle, GPS and implement data on the relay device and transmitting it to the farming data exchange server (step 1410) and parsing, filtering and time stamping the data before depositing it into the agricultural data repository on the server (step 1410).

The second phase is the ECU data extraction phase, which comprises determining whether the message data is VT data or task controller (TC) data (step 1420), identifying matching VT or TC ECU profiles for the message data (steps 1425 and 1435), extracting operating parameters from the VT or TC data in accordance with the communication protocols defined in the selected matching VT and TC profiles stored on the farming data exchange server (steps 1430 and 1440) and storing the extracted operating parameters in the agriculture data repository on the server (step 1445).

In the passive field boundary generation phase, the system parses the stored operating parameters and combines this information with time and position data to determine implement operating events occurring during the farming operation (step 1450), determines the surface area for the operating events (step 1455), finds the outside and inside edges of the surface area based on GPS coordinates to determine the travel path(s) for the farming operation (steps 1465 and 1470), and stores a description of the travel path(s) in an electronic farming record for the business account (step 1460).

Figure 15:
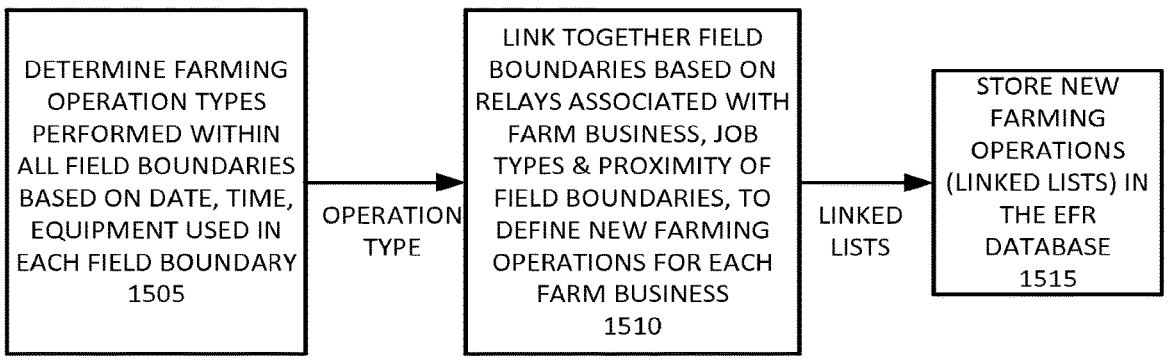
FIG. 15 shows two more flow diagrams illustrating, the final two phases, respectively, in a process for collecting and sharing farming operation data in accordance with an embodiment of the present invention.
Figure 15:
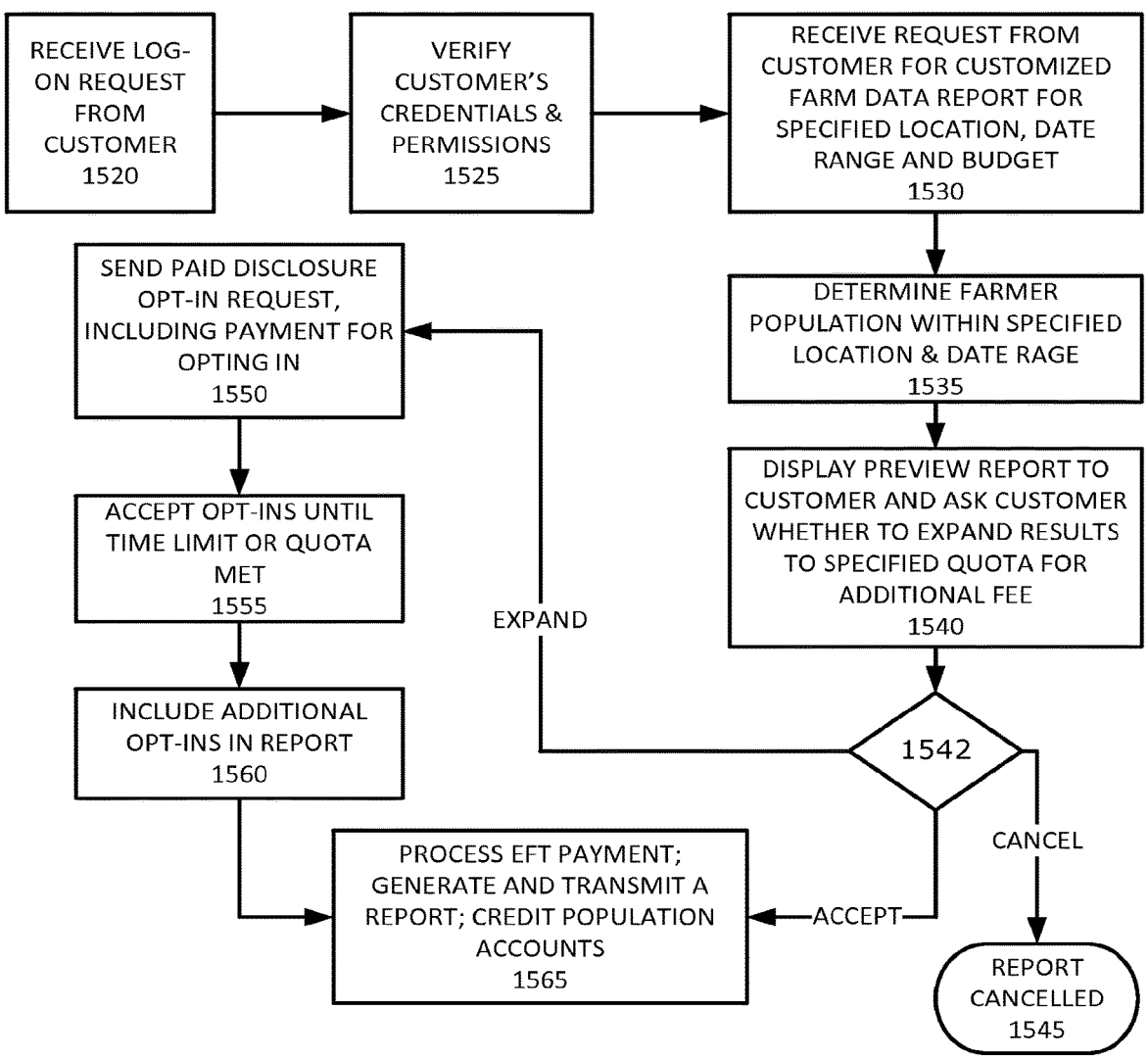

FIG. 15 shows two more flow diagrams illustrating the final two phases, respectively, in a process for collecting and sharing farming operation data in accordance with an embodiment of the present invention. As shown in FIG. 15, the passive job generation phase comprises determining farming operation types for all farming operations performed within field boundaries based on date, time and equipment used (step 1505), linking together field boundaries based on relay devices associated with a farming business to define new farming operations for each farming business (step 1510), and storing the new farming operations in linked lists in the EFR (business entity) database (step 1515). In the farm data sharing phase, the farming operation exchange receives a logon request from a customer (1520), verifies the customer's credentials and permissions (step 1525) and receives a request from the customer for a customized farm data report for a specified location, date range and budget (step 1530). The system then determines the population of farming businesses within the specified location and date range (step 1535), displays a preview report and prompts the customer to specify whether to accept, expand or cancel the results (steps 1540 and 1542).

If the customer cancels the results, then the report is canceled and processing stops (step 1545). However, if the customer accepts the results, the system initiates and completes a customer payment by electronic funds transfer (EFT) prior to generating and transmitting a farming data report and providing credits to the population of farming businesses who supplied data for the report (step 1565). But if the customer chooses to expand the results, the system is optionally programmed to send opt-in requests to relevant farming businesses disclosing payment terms for participation (step 1550), accepts opt-ins until a specified time limit or quota is met (step 1555) and includes the additional opt-ins in the report (step 1560). Finally, the system initiates and completes a customer payment by electronic funds transfer (EFT) prior to generating and transmitting a farming data report and providing credits to the population of farming businesses who participated in supplying data for the original and expanded results (step 1565).

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and the appended claims.

We claim:

1. A relay device for tracking farming operations for a farming business, comprising:
   (a) a microprocessor;
   (b) a bus connector for connecting the relay device to a message bus on a farming vehicle or farming implement, wherein the message bus is configured to carry message data generated by the farming vehicle or the farming implement while the farming vehicle and the farming implement are used to perform the farming operation;
   (c) a global positioning system receiver that receives position and time signals from space-based satellites while the farming operation is performed;
   (d) a memory storage area comprising (i) a buffer for receiving and storing the message data carried on the message bus, (ii) a defined filter set for the message data, (iii) an electronic farm record for the farming business, (iv) descriptive information about a farming operation land segment associated with the farming business, and (v) a plurality of implement profiles each defining, for a known farming implement, a known manufacturer code, a known device class, a known version and a known communication protocol; and
   (e) an application program comprising programming instructions that, when executed by the microprocessor, will cause the microprocessor to automatically
      (i) extract content from the message data based on the defined filtering set and use the extracted content to determine that there is a match between the farming implement used to perform the farming operation and the known farming implement corresponding to one of the plurality of implement profiles,
      (ii) use the extracted content, the position data, the time data and the known communication protocol defined by said one of the plurality of implement profiles to determine a set of operating events for the farming operation,
      (iii) determine, based on the set of operating events, that at least one section of the farming implement was in a deactivated state during at least part of the farming operation,
      (iv) determine a travel path for the farming operation based on the deactivated state and the position data and time data, and
      (v) record in the electronic farm record a travel path description for the farming operation;
   (f) wherein the travel path includes only areas of land on the farming operation land segment where the farming vehicle and farming implement traveled while the farming implement was not in the deactivated state, and does not include any areas of land on the farming operation land segment where the farming vehicle and the farming implement either (i) traveled while the farming implement was in the deactivated state, or (ii) did not travel during the farming operation.

2. The relay device of claim 1, wherein the application program further comprises programming instructions that, when executed by the microprocessor, will cause the microprocessor to:
   (a) automatically determine, based on the travel path description and the descriptive information stored in the memory storage area, that at least part of the travel path coincides with at least part of the farming operation land segment, and
   (b) automatically modify the electronic farm record to include the descriptive information about the farming operation land segment.

3. The relay device of claim 1, wherein the descriptive information for the farming operation land segment comprises:
   (a) a latitude coordinate for the farming operation land segment; or
   (b) a longitude coordinate for the farming operation land segment; or
   (c) an elevation above sea-level for the farming operation land segment; or
   (d) a perimeter description for the farming operation land segment; or
   (e) a shape file for the farming operation land segment; or
   (f) a surface area measurement for the farming operation land segment; or
   (g) a length description for the perimeter of the farming operation land segment; or
   (h) a surface area measurement for land enclosed by the farming operation land segment; or
   (i) a global positioning coordinate for the farming operation land segment; or
   (j) an ownership status for the farming operation land segment; or
   (k) a boundary for the farming operation land segment; or
   (l) a tract number for the farming operation land segment; or
   (m) a farm number for the farming operation land segment; or
   (n) a field number for the farming operation land segment; or
   (o) a classification for the farming operation land segment; or
   (p) an administrative county for the farming operation land segment; or (q) a state office for the farming operation land segment; or (r) a common land unit for the farming operation land segment; or (s) a combination of two or more thereof.

4. The relay device of claim 1, wherein (a) the memory storage area stores an operation type for the farming operation; and (b) the programming instructions for the application program are further configured to cause the microprocessor to (1) use the set of operating events and the position and time signals to determine that the farming operation matches the operation type, and (2) modify the electronic farm record to associate the farming operation land segment with the operation type.

5. The relay device of claim 4, wherein the operation type comprises plowing, or tilling, or fertilizing, or planting, or spraying, or spreading or harvesting.

6. The relay device of claim 1, further comprising:

(a) a data presentation module operable with the memory storage area and the microprocessor to prepare at least a portion of the electronic farm record for presentation on a display device; and (b) an input-output subsystem operable with the memory storage area and the microprocessor to transmit said prepared portion of the electronic farm record to the display device for presentation.

7. The relay device of claim 1, further comprising:

(a) a data communications channel for communication with a farming data exchange system; and (b) an exchange interface module operable with the memory storage area and the microprocessor to transmit at least a portion of the electronic farm record to the farming data exchange system via the data communications channel.

8. The relay device of claim 1, wherein a boundary for the farming operation land segment corresponds to a common land unit boundary.

9. The relay device of claim 1, wherein at least a portion of the farming operation land segment is located on two or more common land units.

10. The relay device of claim 1, wherein the travel path description comprises:

(a) a latitude coordinate for the travel path; or (b) a longitude coordinate for the travel path; or (c) an elevation for the travel path; or (d) a perimeter description for the travel path; or (e) a shape file for the travel path; or (f) a surface area measurement for travel path; or (g) a length for a portion of the travel path; or (h) a surface area measurement for land encompassed by the travel path; or (i) a global positioning coordinate for the travel path; or (j) an ownership status for the farming business associated with a location of the travel path; or (k) a boundary for the travel path; or (l) a tract number for a tract of land corresponding to the location of the travel path; or (m) a farm number for the farming business associated with the location of the travel path; or (n) a field number for a field corresponding to the location of the travel path; or (o) a classification for the farming business associated with the location of the travel path; or (p) an administrative county for land corresponding to the location of the travel path; or (q) a state office for land corresponding to the location of the travel path; or (r) a common land unit for land corresponding to the travel path; or (s) a combination of two or more thereof.

* * * * *